United States Patent
Caron et al.

(10) Patent No.: US 10,959,818 B2
(45) Date of Patent: Mar. 30, 2021

(54) COMPUTER-AIDED DESIGN AND MANUFACTURING OF REMOVABLE PARTIAL DENTURE FRAMEWORKS WITH ENHANCED BIOMECHANICAL PROPERTIES

(71) Applicant: 3DRPD INC., Montreal (CA)

(72) Inventors: Eric Caron, Montreal (CA); Faleh Ahmad Tamimi Marino, Montreal (CA); Omar Saleh Alageel, Montreal (CA); Ammar Alsheghri, Montreal (CA); Jun Song, Montreal (CA)

(73) Assignee: 3DRPD, INC., Montreal (CA)

( * ) Notice: Subject to any disclaimer, the term of this patent is extended or adjusted under 35 U.S.C. 154(b) by 463 days.

(21) Appl. No.: 15/556,763

(22) PCT Filed: Mar. 8, 2016

(86) PCT No.: PCT/CA2016/050248
§ 371 (c)(1),
(2) Date: Sep. 8, 2017

(87) PCT Pub. No.: WO2016/141474
PCT Pub. Date: Sep. 15, 2016

(65) Prior Publication Data
US 2018/0042708 A1     Feb. 15, 2018

Related U.S. Application Data

(60) Provisional application No. 62/130,231, filed on Mar. 9, 2015.

(51) Int. Cl.
*A61C 13/267* (2006.01)
*A61C 13/00* (2006.01)
(Continued)

(52) U.S. Cl.
CPC .......... *A61C 13/267* (2013.01); *A61C 9/0046* (2013.01); *A61C 13/0003* (2013.01); *A61C 13/04* (2013.01); *A61C 13/2255* (2013.01)

(58) Field of Classification Search
CPC ... A61C 13/0003; A61C 13/04; A61C 13/267; A61C 13/2255; A61C 9/0046; A61C 13/0004; A61C 19/04
See application file for complete search history.

(56) References Cited

U.S. PATENT DOCUMENTS

| 4,521,517 A | 6/1985 | Gauthier |
| 4,776,960 A | 10/1988 | Cerroni |

(Continued)

FOREIGN PATENT DOCUMENTS

| EP | 0145874 A2 | 6/1985 |
| EP | 2057964 B1 | 5/2014 |

(Continued)

OTHER PUBLICATIONS

Shahmiri, Reza & Das, Raj & Aarts, John & Bennani, Vincent. (2014). Finite element analysis of an implant-assisted removable partial denture during bilateral loading: Occlusal rests position. The Journal of Prosthetic Dentistry. 112.10.1016/j.prosdent .2014.04. 023.*

(Continued)

*Primary Examiner* — Saif A Alhija
*Assistant Examiner* — Peter Pham
(74) *Attorney, Agent, or Firm* — Erise IP, P.A.

(57) ABSTRACT

A method is provided for designing and fabricating a removable partial denture (RPD) framework including clasp retainers configured for removable engagement with abutment teeth of a patient. The method includes obtaining an initial digital model of the RPD framework based on patient image data. For each clasp retainer, a set of relevant geo- (Continued)

metric parameters is identified, each relevant geometric parameter being provided with a nominal value, and a target value of dislodging force is provided. The method further includes performing a force analysis on the initial digital model to determine corrected values for the relevant geometric parameters of each clasp retainer such that when the corrected values are assigned to the relevant geometric parameters, the dislodging force matches its target value. The method also includes obtaining a corrected digital model based on the corrected values, and fabricating the RPD framework based on the corrected digital model.

21 Claims, 14 Drawing Sheets

(51) Int. Cl.
  *A61C 13/01* (2006.01)
  *A61C 13/225* (2006.01)
  *A61C 9/00* (2006.01)

(56) References Cited

U.S. PATENT DOCUMENTS

| | | | |
|---|---|---|---|
| 4,798,802 | A | 1/1989 | Ryan |
| 4,869,877 | A | 9/1989 | Sellew et al. |
| 5,405,780 | A | 4/1995 | Hamilton, Jr. |
| 5,798,924 | A | 8/1998 | Eufinger et al. |
| 6,284,529 | B1 | 9/2001 | Carrera |
| 6,316,246 | B1 | 11/2001 | Hazaka |
| 6,560,895 | B1 | 5/2003 | Clark |
| 6,814,575 | B2 | 11/2004 | Poirier |
| 8,066,793 | B2 | 11/2011 | Sinclair |
| 8,121,718 | B2 | 2/2012 | Rubbert et al. |
| 8,266,940 | B2 | 9/2012 | Riemeier et al. |
| 8,337,199 | B2 | 12/2012 | Wen |
| 8,359,114 | B2 | 1/2013 | Steingart et al. |
| 9,161,823 | B2 * | 10/2015 | Morton .............. A61C 7/00 |
| 2005/0089822 | A1 * | 4/2005 | Geng .............. A61C 13/0004 433/215 |
| 2009/0075237 | A1 * | 3/2009 | Garcia-Aparicio .............. A61C 13/0004 433/202.1 |
| 2009/0246736 | A1 * | 10/2009 | Holzner .............. A61C 13/0004 433/201.1 |
| 2011/0129792 | A1 | 6/2011 | Berckmans, III et al. |
| 2011/0191081 | A1 | 8/2011 | Malfliet et al. |
| 2012/0063655 | A1 | 3/2012 | Dean et al. |
| 2012/0277899 | A1 * | 11/2012 | Chun .............. A61C 11/00 700/118 |
| 2012/0282572 | A1 | 11/2012 | MacLeod et al. |
| 2013/0218531 | A1 * | 8/2013 | Deichmann .......... A61C 9/0053 703/1 |
| 2014/0051037 | A1 * | 2/2014 | Fisker .............. A61C 8/0048 433/213 |
| 2018/0153659 | A1 * | 6/2018 | Fisker .............. A61C 5/77 |

FOREIGN PATENT DOCUMENTS

| | | |
|---|---|---|
| GB | 1023051 A | 3/1966 |
| WO | 2008131159 A1 | 10/2008 |
| WO | 2010042700 A2 | 4/2010 |
| WO | 2011139276 A1 | 11/2011 |
| WO | 2012007003 A1 | 1/2012 |
| WO | 2012041329 A1 | 4/2012 |

OTHER PUBLICATIONS

G. Yan et al., "The computer-aided design and rapid prototyping fabrication of removable partial denture framework," 2009 2nd IEEE International Conference on Computer Science and Information Technology, Beijing, 2009, pp. 266-268. doi: 10.1109/ICCSIT.2009.5234720.*

Sandu, Liliana et al. "Finite Element Analysis of Stress Distribution in the Cast Clasps, Direct Retainers of a Removable Partial Denture." (2003).*

Liliana Sandu, Nicolae Faur, Cristina Bortun, "Finite Element Analysis of Stress Distribution in the Cast Clasps, Direct Retainers of a Removable Partial Denture", Original Articles, TMJ 2003, vol. 53, No. 3-4, pp. 264-266.

Daniel Lin, Qing Li, Wei Li, Michael Swain, "Dental Implant Induced Bone Remodeling and Associated Algorithms", Elsevier, Journal of the Mechanical Behavior of Biomedical Materials, 2009, vol. 2, pp. 410-432.

C. Bortun, A. Cemescu, N. Faur, L. Sandu, F. Topala, "Reverse Enginering and Finite Elements Analysi in Removable Partial Denture", European Cells and Materials, 2007, vol. 13, Suppl. 3, p. 27.

Akikazu Shinya, Daiichiro Yokoyama, "Finite Element Analysis for Dental Prosthetic Design", Finite Element Analysis, David Moratal (Ed.), INTECH, Aug. 2010, pp. 3-110, https://www.intechopen.com/books/finite-element-analysis/finite-element-analysis-for-dental-prosthetic-design.

Asmaa Nabil Saad, et al., "Stresses Around the Abutment Teeth and Implants Supporting an Implant Supported Removable Partial Denture", Journal of Applied Sciences Research, 2012, vol. 8, No. 8, pp. 4308-4315.

Cristina Maria Bortun et al., "Wax-Pattern or Metallic Framework Investigations Trough Stress and Deformation Analysis", International Poster Journal of Dentistry and Oral Medicine, 2008, vol. 10, No. 4, Poster 427, 4 pages.

International Search Report dated Jun. 8, 2016; International Application No. PCT/CA2016/050248; International Filing Date: Mar. 8, 2016; Applicant: 3DRPD Inc.

Written Opinion of the International Searching Authority dated Jun. 8, 2016; International Application No. PCT/CA2016/050248; International Filing Date: Mar. 8, 2016; Applicant: 3DRPD Inc.

Notification of Transmittal of International Preliminary Report on Patentability dated Jun. 29, 2017; International Application No. PCT/CA2016/050248; International Filing Date: Mar. 8, 2016; Applicant: 3DRPD Inc.

* cited by examiner

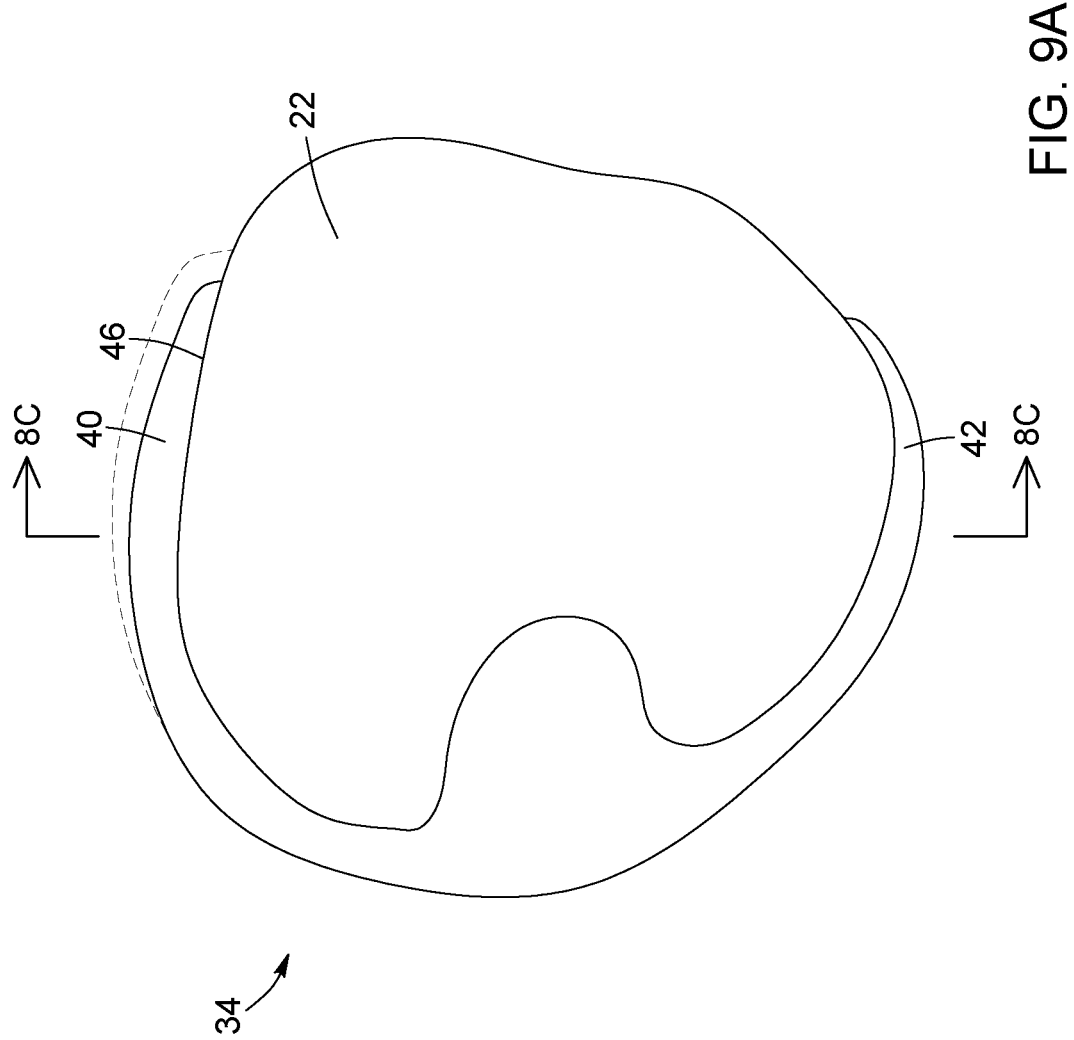

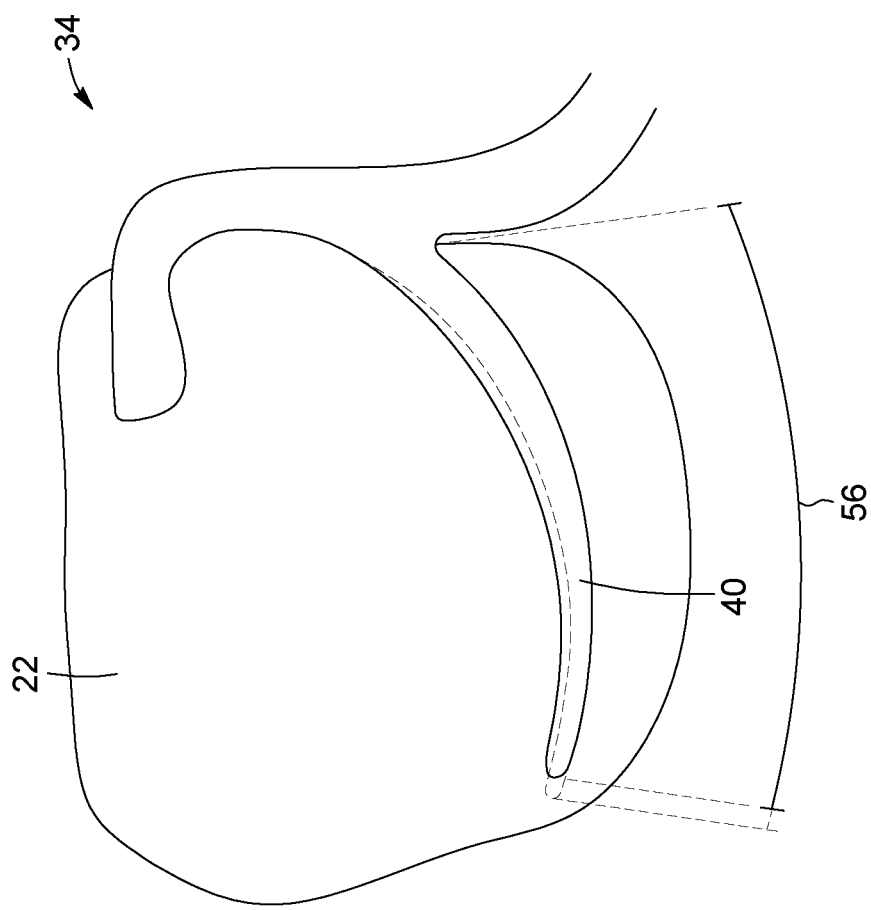

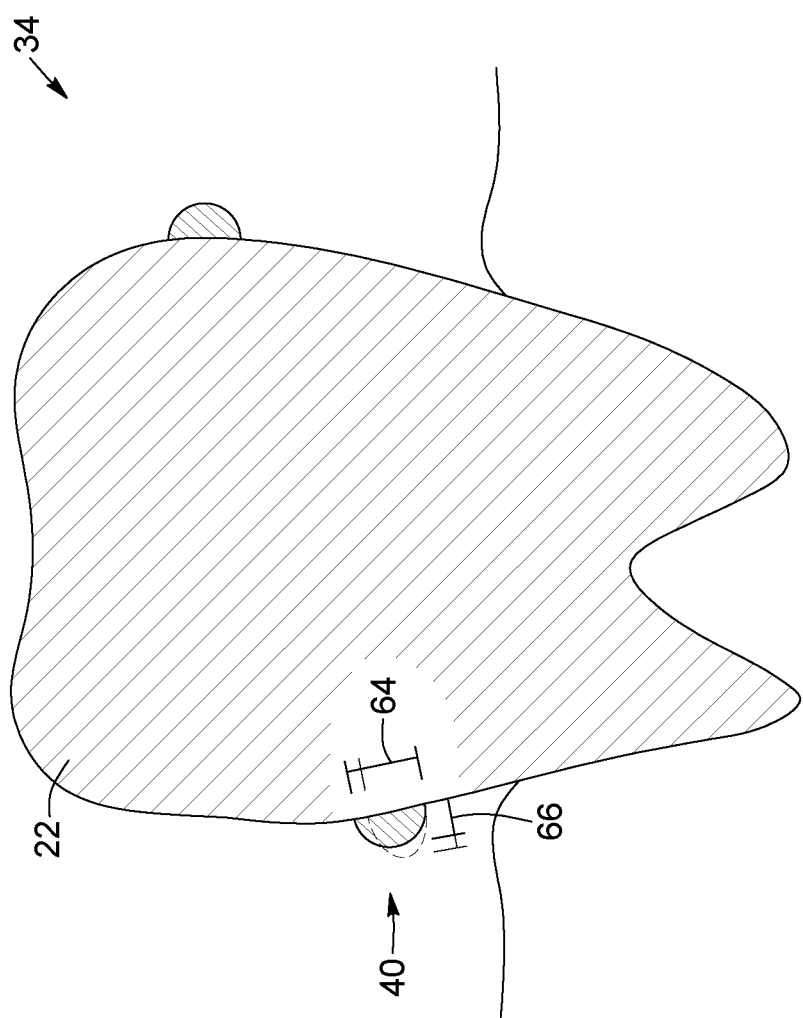

COMPUTER-AIDED DESIGN AND MANUFACTURING OF REMOVABLE PARTIAL DENTURE FRAMEWORKS WITH ENHANCED BIOMECHANICAL PROPERTIES

RELATED APPLICATIONS

The present application is a national stage application under 35 U.S.C. § 371 of International Application No. PCT/CA2016/050248, filed 8 Mar. 2016, which claims priority to U.S. Provisional Patent Application No. 62/130,231, filed 9 Mar. 2015. The above referenced applications are hereby incorporated by reference into the present application in their entirety.

TECHNICAL FIELD

The general technical field relates to dental prostheses and, in particular, to computer-aided methods for designing and manufacturing removable partial dentures with enhanced biomechanical properties.

BACKGROUND

Dental prostheses are appliances and devices used to repair or correct, wholly or partially, intraoral defects such as, for example, missing teeth, missing parts of teeth and other missing or defective anatomical oral structures. Dental prostheses aim to restore a patient's dentition to its natural form including, without limitation, the rehabilitation of oral functions (e.g., mastication and swallowing), the correction of speech defects and the improvement of facial aesthetics. Various types of dental prostheses exist, including permanently fixed prostheses (e.g., crowns and bridges) and removable prostheses (e.g., removable partial dentures and plates).

Removable partial dentures (RPDs) are dental prostheses that allow for the restoration of one or more but not all of the natural teeth of a patient. RPDs are designed for convenient and repeated insertion in and removal from a patient's mouth. RPDs are generally indicated for in partially edentulous patients who cannot have fixed prostheses due to, for example, health conditions, cost or aesthetics considerations, the extent and position of the edentulous span. RPDs are supported and retained by remaining natural teeth (referred to as "abutment teeth"), tissue and/or implants.

Traditionally, RPDs have been made of casted metals and alloys (e.g., cobalt-chromium alloys, titanium and titanium alloys, and gold alloys) using the lost-wax technique. The lost-wax technique is a laborious and inherently imprecise manual process that has remained more or less unchanged for more than fifty years. The lost-wax technique poses many challenges to the design and engineering of RPDs. In particular, RPDs fabricated using the lost-wax technique often tend to be under-engineered and to have a design that is not or hardly customizable. As a result, conventional RPDs are generally more likely to deform, wear out or break under prolonged and/or excessive masticatory loads.

In recent years, computer-aided design and computer-aided manufacturing (CAD/CAM) techniques and processes have begun to be applied to the design and fabrication of RPD metallic frameworks. These techniques generally involve steps of acquiring three-dimensional (3D) digital image data of a patient's oral cavity and dentition (e.g., jaw and tooth anatomy); creating a 3D digital model of the RPD framework to be fabricated from the digital image data; and fabricating a physical model of RPD framework using CAM processes. CAD/CAM technologies have shown the potential to improve the precision, reliability, lifetime and overall quality of RPDs, while reducing human errors and patient chair time associated with conventional hand-made RPDs.

However, despite current and anticipated benefits, numerous challenges remain in the development of CAD/CAM techniques for the design and fabrication of RDPs and other dental prostheses.

SUMMARY

According to an aspect, there is provided a method for designing and fabricating a removable partial denture (RPD) framework including a plurality of clasp retainers, each clasp retainer being configured for removable engagement with a corresponding one of a number of abutment teeth of a patient. The method includes:

providing patient image data of at least part of an oral cavity of the patient;

obtaining an initial digital model of the RPD framework based on the patient image data;

for each clasp retainer, identifying a set of relevant geometric parameters and providing each relevant geometric parameter with a nominal value in the initial digital model;

providing, for each clasp retainer, a target value of a dislodging force for disengaging the clasp retainer from the corresponding abutment tooth with which the clasp retainer is configured for engagement;

performing a force analysis on the initial digital model to determine corrected values for the relevant geometric parameters of each clasp retainer, such that when the corrected values are assigned to the relevant geometric parameters, the dislodging force associated to each clasp retainer matches the target value thereof;

correcting the initial digital model by replacing, for each clasp retainer, the nominal values of the relevant geometric parameters by the corresponding corrected values, thereby obtaining a corrected digital model of the RPD framework; and fabricating the RPD framework based on the corrected digital model.

In some implementations, the step of providing the patient image data includes acquiring the patient image data using an image capture device.

In some implementations, the image capture device is an optical scanner.

In some implementations, the step of obtaining the initial digital model of the RPD framework includes:

providing a virtual library containing a plurality of RPD framework templates; and accessing the virtual library and selecting therefrom a selected one of the plurality of RPD framework templates as the initial digital model of the RPD framework.

In some implementations, the step of obtaining the initial digital model of the RPD framework further includes refining the selected one of the plurality of RPD framework templates in view of the patient image data.

In some implementations, the step of obtaining the initial digital model of the RPD framework includes providing the initial digital model as an initial surface representation of the RPD framework.

In some implementations, the step of performing the force analysis on the initial digital model of the RPD framework includes a preliminary step of converting the initial digital model from the initial surface representation to a volume representation of the RPD framework.

In some implementations, the initial surface representation of the RPD framework is in a stereolithography (STL) format.

In some implementations, the set of relevant geometric parameters is the same for each clasp retainer.

In some implementations, the nominal values provided to the set of relevant geometric parameters are the same for each clasp retainer.

In some implementations, each clasp arm includes a clasp body and a retentive clasp arm having a proximal end, a terminal end, a length extending between the proximal end and the terminal end, and a transverse cross-section perpendicular to the length, the retentive clasp arm being cantilevered from the clasp body at the proximal end thereof and configured to engage and extend around at least a portion of a lateral surface of the corresponding abutment tooth, the retentive clasp arm being resiliently deflectable relative to the lateral surface of the corresponding abutment tooth during insertion and removal of the RPD framework; and the set of relevant geometric parameters of each clasp arm includes the length of the retentive clasp arm and one or more dimensional properties of the transverse cross-section of the retentive clasp arm.

In some implementations, the one or more dimensional properties of the transverse cross-section of the retentive clasp arm of each clasp retainer include at least one of a diameter, a radius, a width, a thickness, a surface area, and an area moment of inertia of the transverse cross-section.

In some implementations, the transverse cross-section of the retentive clasp arm of each clasp retainer is semicircular and includes a flat portion and a curved portion, the flat portion being configured to engage the lateral surface of the corresponding abutment tooth, the one or more dimensional properties of the transverse cross-section of the retentive clasp arm being a width defined by the flat portion and a thickness extending perpendicularly to the width.

In some implementations the step of providing the target value of the dislodging force of one of the plurality of clasp retainers is performed based on one or more of the following:
  a number of the plurality of clasp retainers;
  an arrangement of the plurality of clasp retainers in the RPD framework;
  a type of the plurality of clasp retainers; and
  a position of the one of the plurality of clasp retainers in the RPD framework.

In some implementations, the target value of the dislodging force is the same for each clasp retainer.

In some implementations, for each clasp retainer, the step of providing the target value of the dislodging force includes:
  providing a correspondence table between a set of possible force values for the target value of the dislodging force of the clasp retainer and a set of possible RPD framework configurations; and
  accessing the correspondence table to determine the target value of the dislodging force from the possible force values in view of an actual configuration of the RPD framework.

In some implementations, the method further includes generating the correspondence table by performing mechanical characterization tests on physical RPD framework models, each physical RPD framework model having one of the set of possible RPD framework configurations.

In some implementations, for each clasp retainer, the step of providing the target value of the dislodging force includes providing the target value of the dislodging force according to a predetermined value of masticatory force.

In some implementations, the method further includes determining the predetermined value of masticatory force from at least one of experimental data, analytical calculations and numerical calculations.

In some implementations, the step of performing the force analysis on the initial digital model includes performing a finite element analysis.

In some implementations, the step of performing the force analysis on the initial digital model includes, for each clasp retainer:
  providing one or more force equations relating the dislodging force of the clasp retainer to the set of relevant geometric parameters of the clasp retainer;
  setting the dislodging force equal to the target value in the one or more force equations; and
  solving the one or more force equations to obtain solution values for the relevant geometric parameters, the solution values corresponding to the corrected values of the relevant geometric parameters.

In some implementations, the one or more force equations also relates the dislodging force of the clasp retainer to a deflection of the clasp retainer; and the step of solving the one or more force equations also includes imposing a deflection constraint that a value of the deflection of the clasp retainer remains below a predetermined deflection threshold.

In some implementations, the one or more force equations also relates the dislodging force of the clasp retainer to a bending stress in the clasp retainer; and the step of solving the one or more force equations also includes imposing a stress constraint that a value of the bending stress in the clasp retainer remains below a predetermined bending stress threshold.

In some implementations, the one or more force equations account for a friction force between the clasp retainer and the abutment tooth.

In some implementations, the step of correcting the initial digital model includes providing the corrected digital model of the RPD framework as a corrected surface representation of the RPD framework.

In some implementations, the step of fabricating the RPD framework based on the corrected digital model includes using a computer-aided manufacturing (CAM) process.

In some implementations, the CAM process is an additive manufacturing process.

In some implementations, the additive manufacturing process is a selective laser sintering process.

According to another aspect, there is provided a method for improving an initial digital model of a removable partial denture (RPD) framework obtained based on patient image data of at least part of an oral cavity of the patient. The method includes:
  providing the initial digital model of the RPD framework, the RPD framework including a plurality of clasp retainers, each clasp retainer being configured for removable engagement with a corresponding one of a number of abutment teeth of a patient and characterized by a set of relevant geometric parameters, each relevant geometric parameter being provided with a nominal value in the initial digital model;
  providing, for each clasp retainer, a target value of a dislodging force for disengaging the clasp retainer from the corresponding abutment tooth with which the clasp retainer is configured for engagement;
  performing a force analysis on the initial digital model to determine corrected values for the relevant geometric parameters of each clasp retainer, such that when the corrected values are assigned to the relevant geometric parameters, the dislodging force associated to each clasp retainer matches the target value thereof; and correcting the initial digital model by replacing, for each clasp retainer, the nominal values of the relevant geometric parameters by the corresponding corrected values, thereby obtaining a corrected digital model of the RPD framework.

In some implementations, the step of providing the initial digital model includes providing the initial digital mode as an initial surface representation of the RPD framework.

In some implementations, the step of performing the force analysis on the initial digital model of the RPD framework includes a preliminary step of converting the initial digital model from the initial surface representation to a volume representation of the RPD framework.

In some implementations, the initial surface representation of the RPD framework is in a stereolithography (STL) format.

In some implementations, the set of relevant geometric parameters is the same for each clasp retainer.

In some implementations, the nominal values provided to the set of relevant geometric parameters are the same for each clasp retainer.

In some implementations, each clasp arm includes a clasp body and a retentive clasp arm having a proximal end, a terminal end, a length extending between the proximal end and the terminal end, and a transverse cross-section perpendicular to the length, the retentive clasp arm being cantilevered from the clasp body at the proximal end thereof and configured to engage and extend around at least a portion of a lateral surface of the corresponding abutment tooth, the retentive clasp arm being resiliently deflectable relative to the lateral surface of the corresponding abutment tooth during insertion and removal of the RPD framework; and the set of relevant geometric parameters of each clasp arm includes the length of the retentive clasp arm and one or more dimensional properties of the transverse cross-section of the retentive clasp arm.

In some implementations, the one or more dimensional properties of the transverse cross-section of the retentive clasp arm of each clasp retainer include at least one of a diameter, a radius, a width, a thickness, a surface area, and an area moment of inertia of the transverse cross-section.

In some implementations the transverse cross-section of the retentive clasp arm of each clasp retainer is semicircular and includes a flat portion and a curved portion, the flat portion being configured to engage the lateral surface of the corresponding abutment tooth, the one or more dimensional properties of the transverse cross-section of the retentive clasp arm being a width defined by the flat portion and a thickness extending perpendicularly to the width.

In some implementations, the step of providing the target value of the dislodging force of one of the plurality of clasp retainers is performed based on one or more of the following:
  a number of the plurality of clasp retainers;
  an arrangement of the plurality of clasp retainers in the RPD framework;
  a type of the plurality of clasp retainers; and
  a position of the one of the plurality of clasp retainers in the RPD framework.

In some implementations, the target value of the dislodging force is the same for each clasp retainer.

In some implementations, for each clasp retainer, the step of providing the target value of the dislodging force includes:

providing a correspondence table between a set of possible force values for the target value of the dislodging force of the clasp retainer and a set of possible RPD framework configurations; and accessing the correspondence table to determine the target value of the dislodging force from the possible force values in view of an actual configuration of the RPD framework.

In some implementations, the method further includes generating the correspondence table by performing mechanical characterization tests on physical RPD framework models, each physical RPD framework model having one of the set of possible RPD framework configurations.

In some implementations, for each clasp retainer, the step of providing the target value of the dislodging force includes providing the target value of the dislodging force according to a predetermined value of masticatory force.

In some implementations, the method further includes determining the predetermined value of masticatory force from at least one of experimental data, analytical calculations and numerical calculations.

In some implementations, the step of performing the force analysis on the initial digital model includes performing a finite element analysis.

In some implementations, the step of performing the force analysis on the initial digital model includes, for each clasp retainer:
  providing a one or more force equations relating the dislodging force of the clasp retainer to the set of relevant geometric parameters of the clasp retainer;
  setting the dislodging force equal to the target value in the one or more force equations; and
  solving the one or more force equations to obtain solution values for the relevant geometric parameters, the solution values corresponding to the corrected values of the relevant geometric parameters.

In some implementations, the one or more force equations also relates the dislodging force of the clasp retainer to a deflection of the clasp retainer; and the step of solving the one or more force equations also includes imposing a constraint that a value of the deflection of the clasp retainer remains below a predetermined threshold.

In some implementations, the one or more force equations also relates the dislodging force of the clasp retainer to a bending stress in the clasp retainer; and the step of solving the one or more force equations also includes imposing a stress constraint that a value of the bending stress in the clasp retainer remains below a predetermined bending stress threshold.

In some implementations, the one or more force equations account for a friction force between the clasp retainer and the abutment tooth.

In some implementations, the step of correcting the initial digital model includes providing the corrected digital model of the RPD framework as a corrected surface representation of the RPD framework.

In some implementations, the method further includes fabricating the RPD framework based on the corrected digital model.

In some implementations, the step of fabricating the RPD framework based on the corrected digital model includes using a computer-aided manufacturing (CAM) process.

In some implementations, the CAM process is an additive manufacturing process.

In some implementations, the additive manufacturing process is a selective laser sintering process.

According to another aspect, there is provided a computer readable memory storing computer executable instructions thereon that, when executed by a computer, perform steps of:
- receiving patient image data of at least part of an oral cavity of a patient;
- obtaining an initial digital model of a removable partial denture (RPD) framework based on patient image data, the RPD framework including a plurality of clasp retainers, each clasp retainer being configured for removable engagement with a corresponding one of a number of abutment teeth of the patient;
- for each clasp retainer, identifying a set of relevant geometric parameters and providing each relevant geometric parameter with a nominal value in the initial digital model;
- providing, for each clasp retainer, a target value of a dislodging force for disengaging the clasp retainer from the corresponding abutment tooth with which the clasp retainer is configured for engagement;
- performing a force analysis on the initial digital model to determine corrected values for the relevant geometric parameters of each clasp retainer, such that when the corrected values are assigned to the relevant geometric parameters, the dislodging force associated to each clasp retainer matches the target value thereof; and
- correcting the initial digital model by replacing, for each clasp retainer, the nominal values of the relevant geometric parameters by the corresponding corrected values, thereby obtaining a corrected digital model of the RPD framework.

In some implementations, the steps further include outputting the corrected digital model of the RPD framework to a computer-aided manufacturing (CAM) system for fabricating the RPD framework based on the corrected digital model.

According to another aspect, there is provided a removable partial denture (RPD) framework designed and fabricated by the method disclosed herein for designing and fabricating an RPD framework.

Other features and advantages of aspects of the techniques disclosed herein will be better understood upon reading of exemplary embodiments thereof with reference to the appended drawings.

BRIEF DESCRIPTION OF THE DRAWINGS

In FIG. 7A, the retentive clasp arm is engaged with the abutment tooth. In FIG. 7B, the retentive clasp arm is disengaged from the abutment tooth.

In FIG. 8A, the retentive clasp arm is engaged with the abutment tooth. In FIG. 8B, the retentive clasp arm is disengaged from the abutment tooth.

FIG. 9A illustrates the initial digital model and the corrected digital model of a clasp retainer of an RPD framework obtained using an embodiment of the design and fabrication method disclosed herein. FIG. 9B is a side view of FIG. 9A. FIG. 9C is a cross-sectional side view of FIG. 9A, taken along section line 9C.

DETAILED DESCRIPTION

Figure 1:
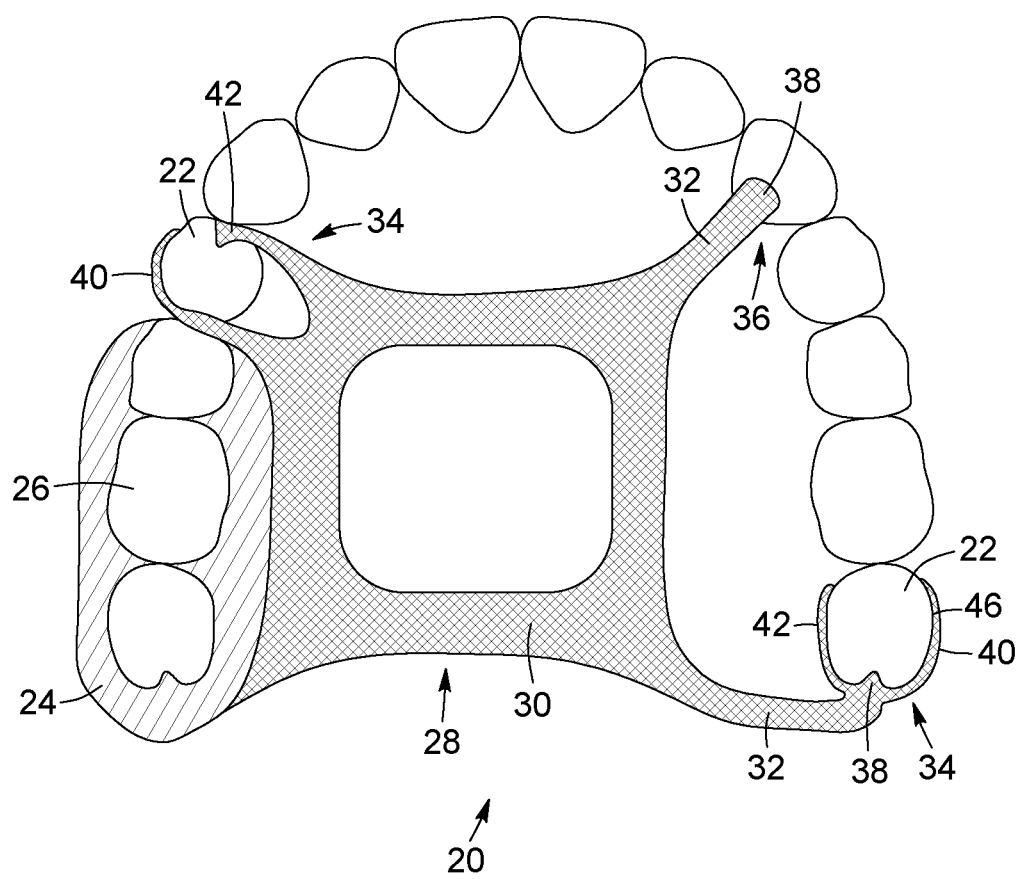
FIG. 1 is a schematic top view of an example of a RPD, the RPD being shown in an engaged configuration with two abutment teeth in the upper dental arch of a patient. The RPD includes a RPD framework, a denture base and denture teeth.

In the following description, similar features in the drawings have been given similar reference numerals, and, in order not unduly encumber the figures, some elements may not be indicated on some figures if they were already identified in preceding figures. It should also be understood herein that the elements of the drawings are not necessarily depicted to scale, since emphasis is placed upon clearly illustrating the elements and structures of the present embodiments.

The present description relates to a method for designing and fabricating a framework of a removable partial denture (RPD), and to a method for improving a digital model of a framework of an RPD. The present description also relates to a computer readable memory storing computer executable instructions thereon which, when executed by a computer, can perform various steps of the methods disclosed herein. The present description further relates to a removable partial denture (RPD) framework designed and fabricated using the designing and fabricating method disclosed herein.

The techniques disclosed herein generally rely on the use of CAD/CAM technology. Throughout the present description, the term "CAD/CAM technology" broadly refers to the use of computer-implemented techniques, methods and processes to enable or aid in the design and manufacture of dental prostheses. As mentioned above, in dentistry, CAD/CAM generally involves three main steps: a first step of acquiring 3D digital image data of a patient's oral cavity and dentition (scanning step); a second step of creating a 3D digital model of the dental prosthesis to be fabricated (CAD step); and a third step of fabricating a physical model of the dental prosthesis from the 3D digital model (CAM step).

The present techniques may be useful in any application where it may be beneficial or necessary to optimize, enhance or otherwise improve the design, biomechanical properties and clinical performance of a RPD or a component thereof (e.g., a RPD framework) designed and manufactured using CAD/CAM technology.

Removable Partial Dentures (RPDs)

As used herein, the term "dental prosthesis" refers to a prosthesis that provides an artificial replacement of one, several or all of the teeth and associated dental structures of a patient or a wearer. It is noted that unless specified otherwise, the terms "patient" and "wearer" are used interchangeably herein. Dental prostheses can be classified as either fixed dental prostheses (e.g., crowns and bridges) or removable dental prostheses (e.g., removable partial dentures and occlusal bite plates). It is to be noted that for simplicity, and unless stated otherwise, the term "dental prosthesis" is intended to encompass both dental prostheses and components of dental prostheses.

The term "removable partial denture" and its acronym "RPD" refer herein to a removable dental prosthesis that can be readily inserted and removed by the patient and that restores or replaces one or more teeth in a partially dentate arch. A removable partial denture may be supported partly or wholly by remaining natural teeth, dental implants or other fixed dental prostheses, and/or the oral mucosa. It is noted that the term "removable partial denture" may also be referred to equivalently as "removable partial denture prosthesis" or "partial removable dental prosthesis".

Figure 2:
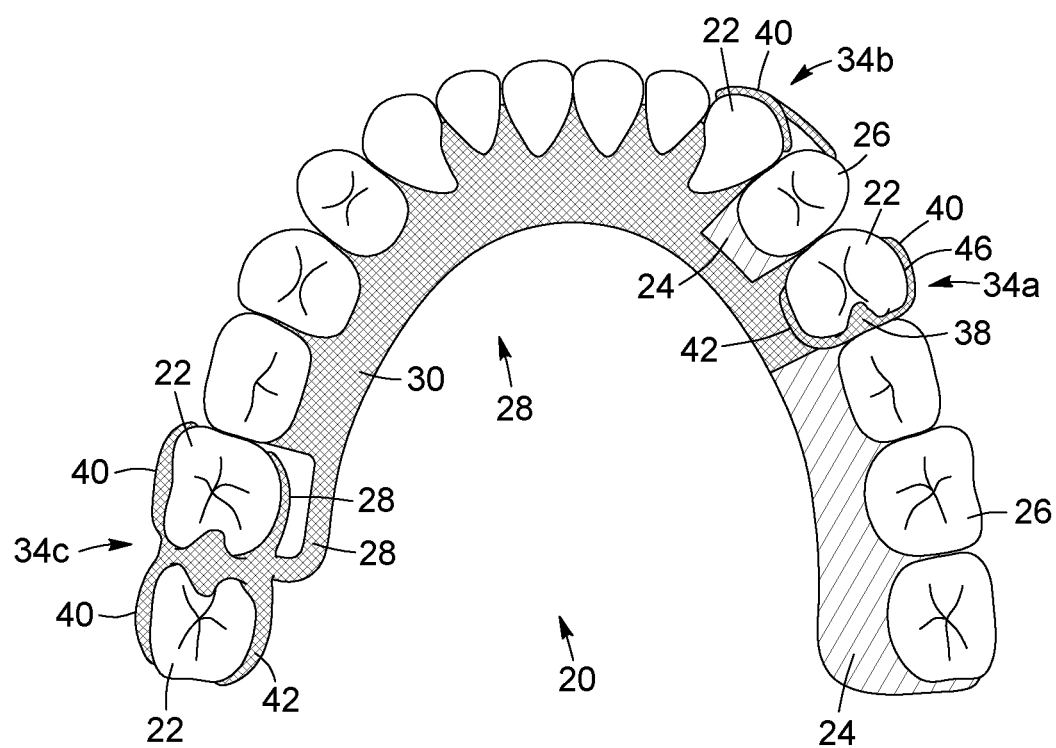
FIG. 2 is a schematic top view of another example of a RPD, the RPD being shown in an engaged configuration with four abutment teeth in the lower dental arch of a patient. The RPD includes a RPD framework, a denture base and denture teeth.
Figure 3:
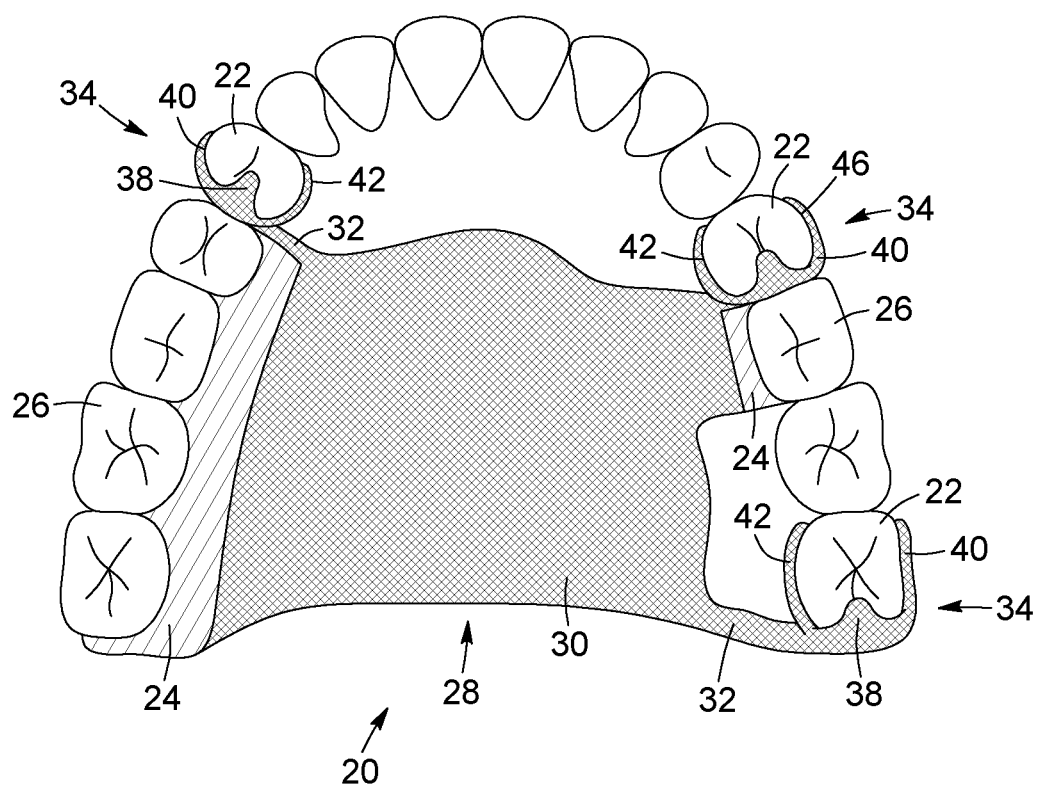
FIG. 3 is a schematic top view of another example of a RPD, the RPD being shown in an engaged configuration with three abutment teeth in the upper dental arch of a patient. The RPD includes a RPD framework, a denture base and denture teeth.

Referring to FIG. 1, a schematic top view representation of an example of a removable partial denture (RPD) 20 is illustrated. It is noted that the RPD 20 depicted in FIG. 1 can be designed and fabricated with enhanced or improved biomechanical properties using the techniques disclosed herein. FIGS. 2 and 3 illustrate two other non-limiting examples of RPDs 20 to which the techniques disclosed herein can be applied.

The RPD 20 is configured for removable engagement with a number of abutment teeth 22, namely two in the example of FIG. 1. Alternatively, the RPDs 20 depicted in FIGS. 2 and 3 configured for removable engagement with four and three abutment teeth 22, respectively. As used herein, the term "abutment tooth" refers to a tooth or a portion of a tooth that serves to retain and/or support an RPD. An abutment tooth can be located in either the upper or the lower dental arch of the patient, and can be embodied by a remaining natural tooth or by a dental implant. The RPDs 20 in FIGS. 1 and 3 are maxillary RPDs, configured for removable engagement with abutment teeth 22 located in the upper dental arch, while the RPD 20 in FIG. 2 is a mandibular RPD, configured for removable engagement with abutment teeth 22 located in the lower dental arch.

It is noted that the RPDs 20 depicted in FIGS. 1 to 3 are provided by example only and that various different RPD configurations can be usefully employed in other implementations of the present techniques. As known in the art, it has been estimated that there can be over tens of thousands possible combinations of teeth and edentulous spaces in opposing arches, each involving a different RPD configuration. Several methods of classifying RPDs are known, of which the Kennedy classification system is probably the most widely used. The Kennedy system divides partially edentulous arches into four main classes: class I having bilateral posterior edentulous spaces; class II having a unilateral posterior edentulous space; class III having an intradental edentulous area; and class IV having an anterior edentulous area that crosses the midline.

Referring to FIG. 1, the RPD 20 generally includes three main components: a denture base 24, one or more denture teeth 26, and a framework 28. The denture base 24 rests on the foundation tissues and provides support and retention to the denture teeth 26. The denture base 24 may be made of acrylic resin such as poly(methyl methacrylate) (PMMA) or of metal. The denture base 24 is often pink to mimic the natural color of gingiva. The denture teeth 26 are artificial prosthetic teeth that are attached to the denture base 24 and that substitute for natural teeth. The denture teeth 26 can be made of acrylic or porcelain. The framework 28 forms the skeleton of the RPD 20 and includes various parts and components intended to provide retention, stability, strength and support to the RPD 20. The framework 28 can be made of a strong and inert material, for example a metallic material, a ceramic material, or a combination thereof. Exemplary metallic materials that can be used to fabricate RPD frameworks include, without limitation, cobalt-chromium (Co—Cr) alloys, titanium and titanium alloys, and gold alloys. The RPD framework 28 supports the denture base 24.

The RPD framework 28 illustrated in FIG. 1 generally includes four main components: a major connector 30, minor connectors 32, direct retainers 34 and indirect retainers 36. The major connector 30 provides rigidity and unification to the RPD 20 by connecting the components on one side of the dental arch to those on the opposite side. More particularly, the major connector 30 connects together, directly or indirectly, all the other components of the RPD 20, and helps distribute occlusal forces to selected teeth and tissues. Minor connectors 32 establish connecting links between the major connector 30 and other components or parts of the RPD 20, for example direct retainers 34, indirect retainers 36 and the denture base 24. Direct retainers 34 are used to retain and prevent dislodgement of the RPD 20. Direct retainers 34 can be classified as intracoronal (e.g., attachments) or extracoronal (e.g., clasp retainers). Indirect retainers 36 assist direct retainers 34 in preventing or resisting rotational displacement of distal extensions of the RPD 20. The indirect retainers 36 generally include a rest 38, which is a rigid extension that controls the seating of the RPD 20.

In FIG. 1, the illustrated direct retainers 34 are clasp retainers, which form the most common type of direct retainers. A clasp retainer, or clap assembly, directly supports and/or provides stability to the RPD by partially enclosing, engaging or otherwise contacting an abutment tooth. It is noted that in the rest of the present description, the reference numeral 34 will be used to designate clasp retainers.

An important function of a clasp retainer is to provide retention against forces of dislodgement by resisting undesired or inadvertent movements of the RPD away from the foundation tissues (e.g., due to gravity and/or sticky food). It is therefore desirable that clasp retainers be configured to withstand sufficiently high denture dislodging forces (e.g., masticatory forces) to ensure satisfactory retention of the RPD.

In FIGS. 1 and 3, the clasp retainers 34 are circumferential clasp retainers. However, other types of clasp retainers can be used in other embodiments, including horizontal clasp retainers such as, for example, ring clasp retainers, embrasure (double Akers) clasp retainers, RPA clasp retainers and roach clasp retainers, and vertical clasp retainers such as, for example, bar clasp retainers (e.g., T-, Y-, L-, I-, U- and S-bar clasp retainers). It is noted that the clasp retainers of the RPD framework may or may not be of the same type, for example depending on their placement and configuration. It will also be appreciated that while the exemplary RPD framework 28 depicted in FIG. 1 is provided with two circumferential clasp retainers 34, other embodiments can include different numbers and/or types of clasp retainers. By way of example, the RPD framework 28 in FIG. 2 includes one circumferential clasp retainer 34*a*, one vertical bar clasp retainer 34*b*, and one embrasure clasp retainer 34*c* formed of a pair of clasp retainers. Meanwhile, the RPD framework 28 in FIG. 3 includes three circumferential clasp retainers 34.

Figure 4A:
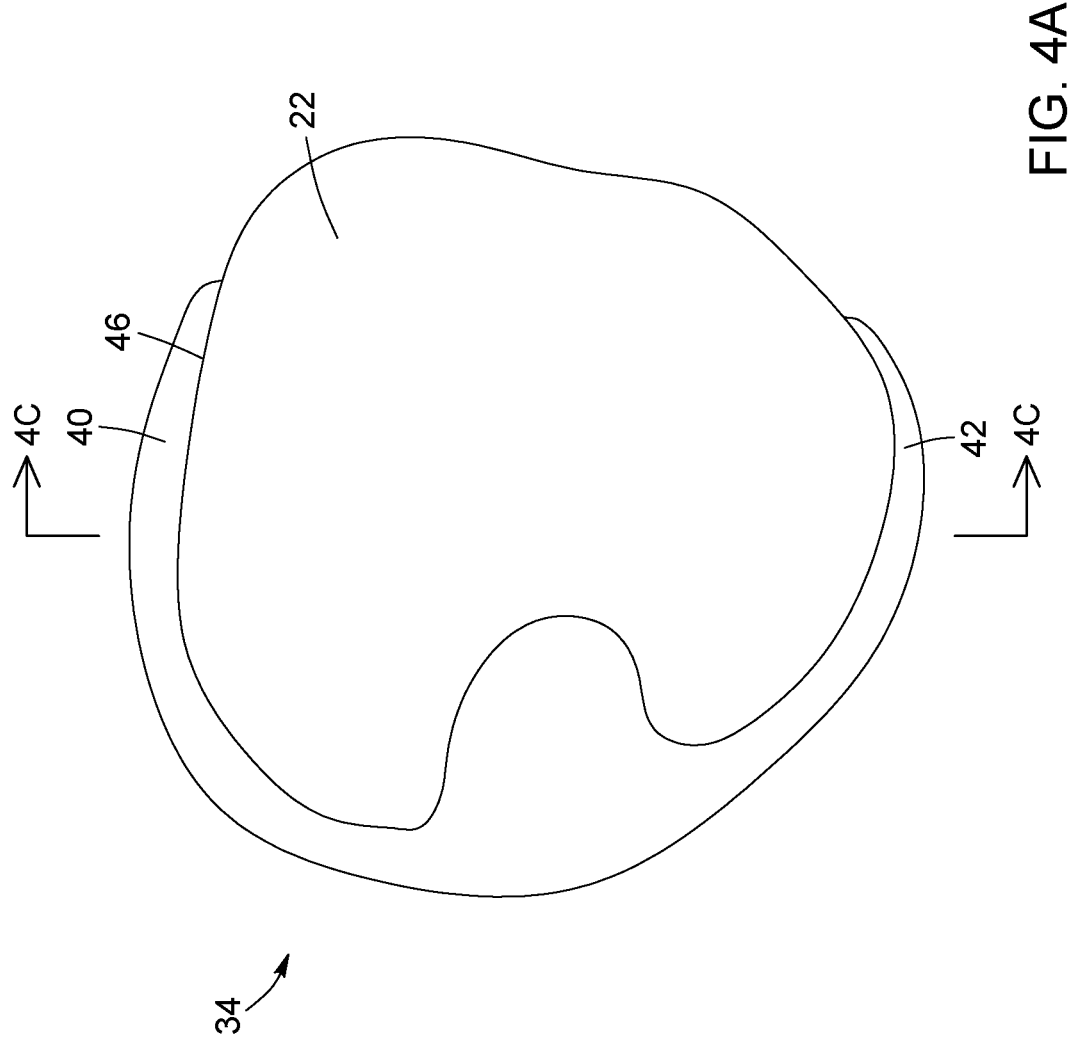
FIG. 4A is a schematic top view of an example of a clasp retainer of an RPD framework.
Figure 4B:
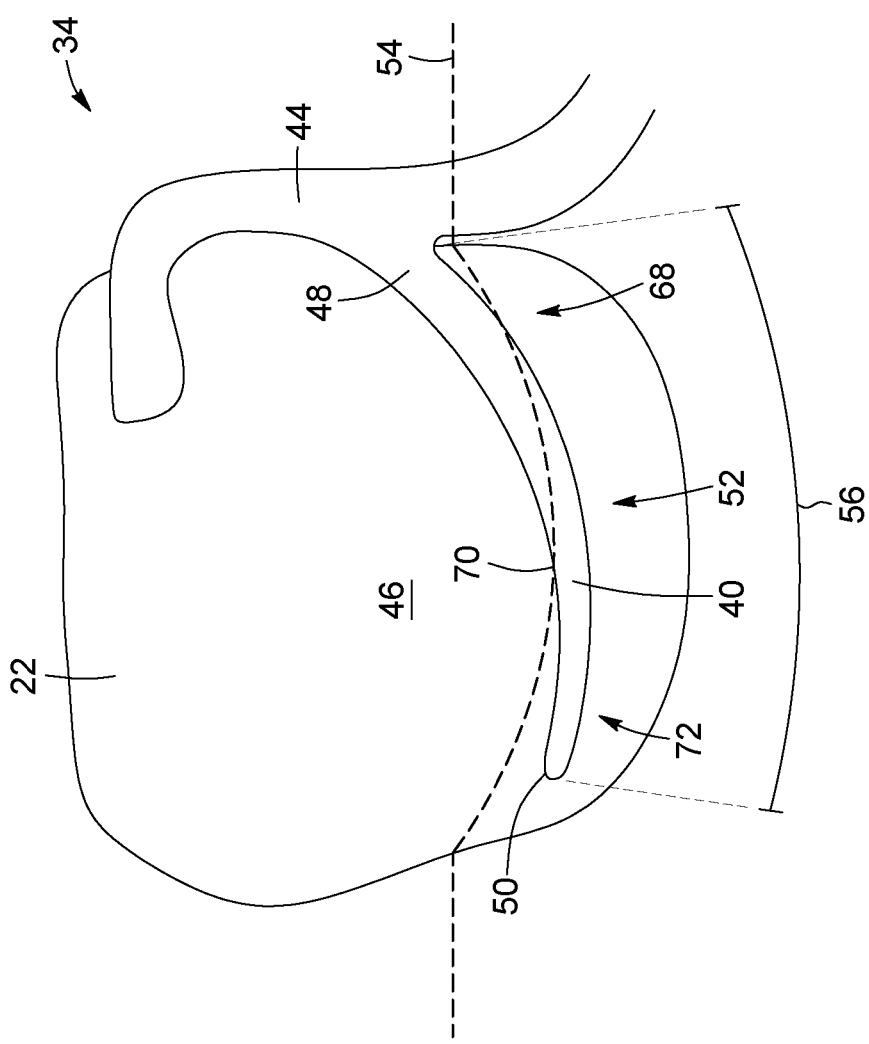
FIG. 4B is a schematic side view of the clasp retainer of FIG. 4A.
Figure 4C:
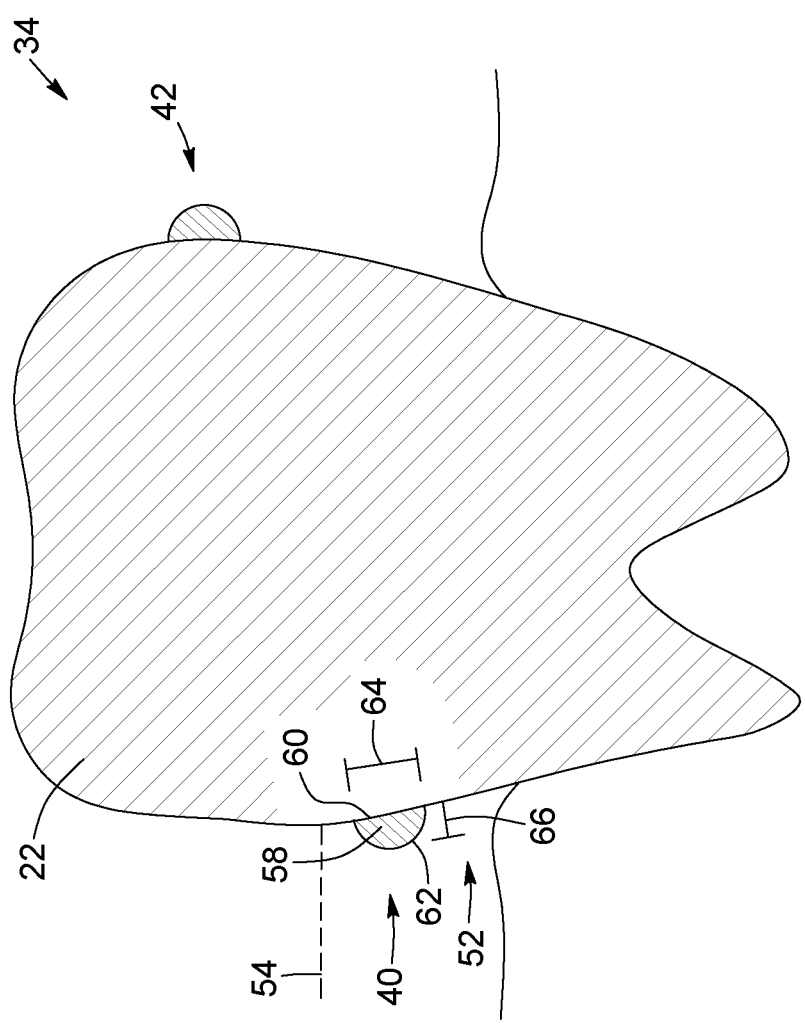
FIG. 4C is a schematic cross-sectional side view of the clasp retainer of FIG. 4A, taken along section line 4C.

Referring to FIGS. 4A to 4C, each clasp retainer 34 includes a flexible retentive clasp arm 40, a rigid reciprocal clasp arm 42, each of which being mounted to and extending from a clasp body 44, which is itself connected to a minor connector 32 (see, e.g., FIG. 1). The retentive clasp arm 40 is cantilevered from the clasp body 44 and provides retention by passing around and partially encircling a lateral surface 46 of the abutment tooth 22. The reciprocal clasp arm 42 engages or contacts the abutment tooth 22 on the side opposite the retentive clasp arm 40 so as to provide reciprocation by counteracting any lateral force imposed by the retentive clasp arm 40.

In FIGS. 4A to 4C, the retentive clasp arm 40 includes a proximal end 48 connected to the clasp body 44 and a terminal end 50 configured for engaging the abutment tooth 22 in an undercut area 52 below the height of contour 54. As known in the art, the term "height of contour" refers to the line encircling a tooth and designating its greatest circumference at a selected axial position or in a specified plane, while the term "undercut" refers to the portion of the lateral surface of an abutment tooth that is below the height of contour in relationship to the path of placement, that is, the specific direction in which a dental prosthesis is placed on the abutment teeth.

Referring still to FIGS. 4A and 4C, the retentive clasp arm 40 has a length 56 and a transverse cross-section 58 perpendicular to the length 56. It is noted that when referring to the retentive clasp arm of a clasp retainer, the term "length" refers herein to the linear dimension extending between its proximal end and its terminal end. It will be appreciated that the length of a retentive clasp arm is generally measured along a curved path.

Depending on the particular application or use, the transverse cross-section of the retentive clasp arm can have different shapes including, without limitation, circular, semicircular, oval, ellipsoidal, polygonal, square and rectangular. It will be appreciated that the dimensions of the transverse cross-section of the retentive clasp arm may be expressed in terms of different parameters (e.g., a diameter, a width, and a thickness) depending on its shape.

By way of example, in the embodiment of FIGS. 4A to 4C, the transverse cross-section 58 of the retentive clasp arm 40 of the clasp retainer 34 is substantially semicircular and includes a flat portion 60 and a curved portion 62. The flat portion is configured to face and engage the lateral surface 46 of the abutment tooth 22. In such a case, the one or more dimensional properties of the transverse cross-section 58 of the retentive clasp arm 40 can be a width 64 defined by extent or linear dimension of the flat portion 60 and a thickness 66 defined as a dimension extending perpendicularly to the width 64.

The retentive clasp arm 40 may also include a proximal portion 68 extending lengthwise from the proximal end 48 to an intermediate point 70 between the proximal end 48 and the terminal end 50, and a terminal portion 72 extending lengthwise from the intermediate point 70 to the terminal end 50. Each of the proximal portion 68 and the terminal portion 72 may be characterized by a respective length and a respective cross-section. In some implementations, the proximal portion 68 has a constant cross-section, while the terminal portion 72 has a cross-section that tapers down lengthwise toward the terminal end 50. Also, in some implementations, the retentive clasp arm 40 is configured to engage the lateral surface 46 of the abutment tooth 22 with the proximal portion 68 extending above or along the height of contour 54 and the terminal portion 72 extending below the height of contour 54.

Referring still to FIGS. 4A to 4C, the retentive clasp arm 40 is configured to be resiliently flexible so as to engage the lateral surface 46 of the abutment tooth 22 and resist removal of the RPD 20, yet flexible enough to be pulled over the abutment tooth 22 by the patient for removal of the RPD 20. From a mechanical point of view, the retentive clasp arm 40 can be modeled as a cantilevered beam undergoing elastic deformation in response to forces applied thereto during insertion and removal of the RPD 20. Retention arises notably from the resistance of the retentive clasp arm 40 to deformation, this resistance to deformation being itself related to the flexibility of the retentive clasp arm 40. In operation, the retentive clasp arm 40 deflects outwardly as it is urged down along the contoured lateral surface 46 of the abutment tooth 22 to settle in the undercut area 52 below the height of contour 54. Once in the undercut area 52, the retentive clasp arm 40 resiliently springs back against the tooth 22 to provide resistance against forces of dislodgement.

It will be appreciated that the magnitude of the force needed to deflect the retentive clasp arm 40 and allow the insertion or removal of the RPD 20 is generally a key parameter in evaluating the clinical performance of the RPD 20. As used herein, the clinical performance of an RPD generally refers to its performance to the application of different forces during masticatory cycles (e.g., compression, shearing and retention forces). This performance may be evaluated using different quantitative or qualitative parameters, properties, conditions, thresholds, rules and/or criteria that are to be fulfilled by the RPD while in use. In particular, the insertion and removal forces should preferably be sufficiently large to avoid a loose RPD 20, but not so large to prevent the RPD 20 from fitting and/or to render the clasp retainer 34 susceptible to plastic deformation and/or fatigue fracture. In other words, it is generally desirable that the amount of retention be the minimum necessary to resist reasonable forces of dislodgement. It is to be noted that other factors that can have an impact on the clinical performance of an RPD include, without limitation: eliminating the risk of fracturing, breaking or otherwise damaging the material forming the RPD framework, avoiding periodontal complications, preserving the masticatory functions of the patient, and preserving aesthetic appearance of the patient.

Retention of the RPD 20 is affected by different factors, including the flexibility of the retentive clasp arm 40, the depth of the terminal end 50 of the retentive clasp arm 40 in the undercut area 52, the proportion of the retentive clasp arm 40 that extends below the height of contour 54, and the location and depth of the undercut area 52. The flexibility of the retentive clasp arm 40 is in turn generally determined by its length, the shape and dimensions of its transverse cross-section, the taper along its length (if any), and the material from which it is made. In general, flexibility is proportional to the length and inversely proportional to the cross-sectional dimensions of the retentive clasp arm 40.

Method for Designing and Fabricating an RPD Framework

Figure 5:
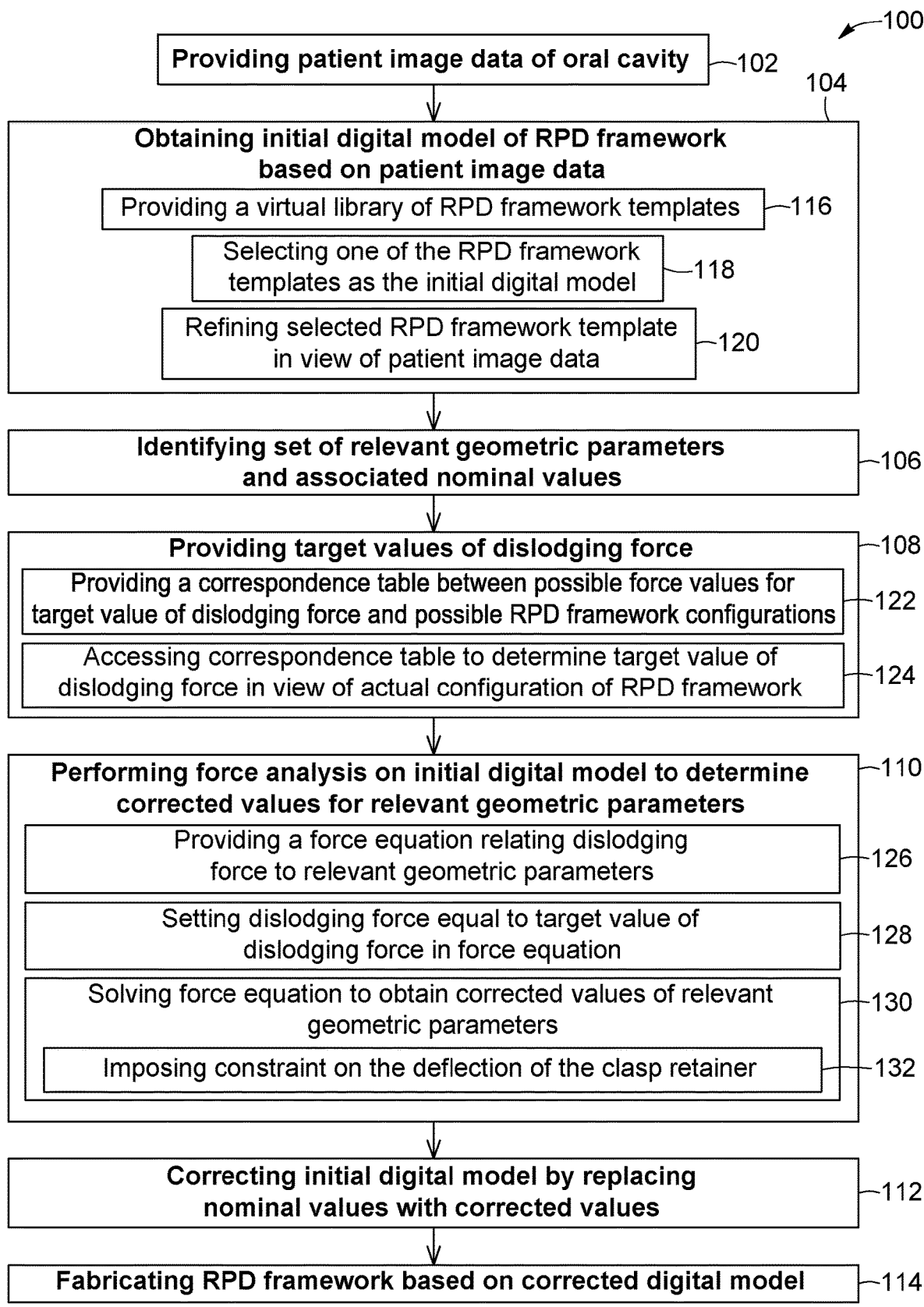
FIG. 5 is a flow chart of a method for designing and fabricating an RPD framework, in accordance with an embodiment.

According to an aspect, and with particular reference to FIGS. 1 to 5, there is provided a method 100 for designing and fabricating a framework of a RPD or, for brevity, an RPD framework. The method 100 can be at least partially computer-implemented. FIG. 5 depicts a flow chart of an embodiment of the method 100, which, by way of example, can be performed to design and fabricate an RPD framework 28 such as the ones illustrated in FIGS. 1 to 3, or another RPD framework. In FIGS. 1 to 3, the RPD framework 28 includes a plurality of clasp retainers 34. Each clasp retainer 34 of the RPD framework 28 is configured for removable engagement with one of a number of abutment teeth 22 of a partially edentulous patient.

It will be appreciated that RPDs are complex devices characterized by having a large number of features in their design (e.g., retainers, rests, connectors, and leverages) and a need to withstand strong mechanical forces and stresses when inserted in the mouth of the wearer. In particular, RPDs are designed so that they provide a retentive force that is higher than the masticatory forces. The removable nature and the expected clinical performance of RPDs impose or at least make it desirable that the mechanical of their framework fulfill certain criteria. For this purpose, it is generally desirable that the geometric and biomechanical properties of RPDs be characterized as a function of the forces to which they are subjected. Various techniques are disclosed herein that aim to design and fabricate RPD frameworks with enhanced geometric and biomechanical properties.

Broadly described, the implementation of the method 100 depicted in FIG. 5 involves a step 102 of providing patient image data of at least part of the oral cavity of the patient, followed by a step 104 of obtaining an initial digital model of the RPD framework based, at least partly, on the patient image data. The method also includes, for each clasp retainer, a step 106 of identifying a set of relevant geometric parameters and providing each relevant geometric parameter with a nominal value in the initial digital model. The method 100 further includes a step 108 of providing, for each clasp retainer, a target value of a denture dislodging force, which represents a sufficient amount of force for dislodging or disengaging the clasp retainer from the abutment tooth with which the clasp retainer is configured for engagement. The method 100 also includes a step 110 of performing a mechanical force analysis on the initial digital model. This virtual force analysis aims to determine corrected values for the relevant geometric parameters of each clasp retainer. These corrected values are such that when they are assigned to the relevant geometric parameters, the denture dislodging force associated to each clasp retainer matches its target value. The method 100 next includes a step 112 of correcting the initial digital model by replacing, for each clasp retainer, the nominal values of the relevant geometric parameters by the corresponding corrected values, thereby obtaining a corrected digital model of the RPD framework. This is followed by a step 114 of fabricating the RPD framework based on the corrected digital model.

In some implementations, the biomechanical properties and clinical performance of the RPD framework designed and fabricated by the present method 100 can be optimized, enhanced or otherwise improved compared with those of RPD framework fabricated using conventional techniques. It is to be noted that other method steps may be performed prior, during or after the above-described steps. The order of one or more of the steps may also differ, and some of the steps may be combined. More regarding various features of the method 100 illustrated in FIG. 5 will be described in greater detail below.

Image Data of the Oral Cavity

Referring to FIG. 5, the method 100 includes a step 102 of providing patient image data of at least part of the oral cavity of the partially edentulous patient. The term "patient image data" may include a digital image itself or digital data that represents, defines or renders viewable a digital image. It is to be noted that, for brevity, the expression "patient image data" may in some instances be shortened to "image data". Also, the terms "image data" and "digital image" can be used herein interchangeably.

Throughout the present description, the term "providing" is used broadly and refers to, but is not limited to, making available for use, acquiring, obtaining, accessing, supplying, receiving, assigning and retrieving. By way of example, in some implementations, the provision of the patient image data can involve the act of directly acquiring the patient image data using an image capture device and making available the image data thus acquired. However, in other implementations, the provision of the patient image data can involve the act of retrieving or receiving previously acquired image data, for example from a database, a virtual library or a storage medium. It is also noted that the phrase "image data of the oral cavity" is intended to encompass both image data of the entire oral cavity and image data of a portion of the oral cavity.

In some implementations, the patient image data may consist of one or more 3D high-resolution digital images representative of the patient's dentition, bones, gingiva, other hard and soft tissues, and any other supporting or surrounding intraoral anatomical structures associated with a patient. In some implementations, the patient image data may be obtained by directly acquiring an image of the patient's oral cavity, for example by using intraoral scanners or contact probes. However, in other implementations, the patient image data may instead be obtained by imaging a previously obtained positive or negative physical template or model of the patient's intraoral structures, such as a cast, impressed, printed or otherwise fabricated physical structure.

The patient image data may be acquired using any suitable image capture device or system capable of acquiring an image or a set of images representative of a patient's oral cavity. In some implementations, the image capture device may be an optical scanner, which may include a camera or a camera system capable of capturing one or more sets of two-dimensional (2D) images from which a 3D representation may be recovered. Other examples of imaging techniques that may be used in the present method 100 to acquire the image data of the patient's oral cavity can include laser scanning, structure light illumination, computed tomography (CT), magnetic resonance imaging (MRI), X-ray radiography, ultrasound imaging, or any technology suitable for acquiring 3D image data or 2D image that can be resolved into 3D image data. Furthermore, in some implementations, the patient image data may be a combined image resulting from the combination of images acquired using differing imaging techniques. Depending on the particular application or use, it may be advantageous to use non-contact, non-invasive and non-radiation-based imaging techniques.

In some implementations, the patient image data forms a digital map of the surface of the patient's oral cavity. The digital map provides information regarding the 3D size, shape and spatial location of various imaged intraoral structures. The patient image data may be obtained in the form of a point cloud representing the 3D coordinates of the imaged surface. Advantageously, the density of the point cloud is sufficiently high to provide an accurate representation of the imaged surface.

In some implementations, a polygonization of the point cloud may be performed to create a virtual surface from the patient image data. In such a case, adjacent data points within the point cloud are linked to form a 2D polygon mesh, for example a triangular mesh. In a polygon mesh, the surface of an object is represented as a set of vertices, edges and faces. Compared to a point cloud representation, a polygon mesh representation can facilitate viewing and manipulating of the image data on a computer screen. Depending on the particular application or use, different file formats can be used for storing polygon mesh data, although it can be advantageous to use a file format that can be read, or converted into a format that can be read, by a CAD software package. It is noted that in alternative implementations, the image data need not be provided as a surface 3D model, but may instead be provided, for example, as a solid 3D model or a series of 2D images.

Initial Digital Model of the RPD

Referring still to FIG. 5, the method 100 also includes a step 104 of obtaining an initial digital model of the RPD framework. In this context, terms such as "digital model" and "computerized model" refer to a 3D virtual representation of an RPD framework. The digital or computerized model can be employed in the design, analysis, simulation and/or manufacture of the RDP framework. It will be understood that the term "3D representation" may include 3D surface representations, 3D volume representations as well as any other suitable types of 3D representations.

The initial, or preliminary, digital model of the RPD framework is created based, at least partly, on the patient image data. In some implementations, a CAD module software adapted to the design of complex or arbitrary 3D objects can be usefully employed for this purpose. It will be appreciated that the initial digital model may be created, simulated and/or rendered using various 3D modeling computer- or software-implemented tools and techniques. As mentioned above, the image data of the patient's oral cavity provides information about the size, shape and spatial location of various intraoral anatomical structures, including the location and extent of the edentulous regions where the RPD may be placed, and the location and number of abutment teeth. In particular, it will be appreciated that the information about the morphology of the patient's dentition contained in the image of the patient's oral cavity can be used in determining the design of the initial model of the RPD framework, notably in terms of the number, size, shape, configuration and placement of the clasp retainers.

In some implementations, the initial, or nominal, digital model of the RPD framework can be based, at least partly, on one or more previously designed, scanned or otherwise obtained models or templates of RPD frameworks with different designs corresponding to different dentition configurations. In such a case, the step 102 of obtaining the initial digital model can include steps of: providing 116 a virtual library containing a plurality of RPD framework templates; accessing 118 the virtual library and selecting therefrom a selected one of the plurality of RPD framework templates as the initial digital model of the RPD framework; and refining 120 the selected one of the plurality of RPD framework templates in view of the patient image data. More particularly, the initial digital model of the RPD framework can be established by searching the database or virtual library to find a pre-stored model or template that would provide an optimal or at least acceptable match with the patient data. Once a pre-stored model or template has been selected, it may be used directly as the initial digital model, or be further refined, improved or otherwise adjusted by an operator to obtain the initial digital model. In other implementations, the initial digital model of the RPD framework may be generated without the aid of a pre-stored model or template.

In some implementations, the step 102 of obtaining the initial digital model can involve providing the initial digital model as an initial 3D surface map or representation of the RPD framework. As used herein, the term "3D surface map" is intended to encompass any suitable 3D surface representation including, without limitation, a point cloud and a 2D polygon mesh. It will also be appreciated that depending on the particular application or use, different digital file formats can be used for storing the initial digital model of the RPD framework. However, as discussed in greater detail below, it can be advantageous to select a format that can be used, or converted into a format that can be used, in other steps of the present method 100, for example the step 110 of performing a virtual force analysis on the initial digital model, the step 112 of correcting the initial digital model, and the step 114 of fabricating the RPD framework based on the corrected digital model. In some implementations, the initial surface representation of the RPD framework is in a stereolithography (STL or .stl) file format. The STL file format, which is widely used for CAM, 3D printing and rapid prototyping, approximates the surface of a 3D object as a polyhedral representation with triangular facets.

Relevant Geometric Parameters of Clasp Retainers

Referring still to FIG. 5, and with further reference to FIGS. 4A to 4C, the method 100 also includes, for each clasp retainer 34, a step 106 of identifying a set of relevant geometric parameters and providing each geometric parameter with a nominal value in the initial digital model. As used herein, the term "geometric parameter" is used broadly to refer to any dimensional property or feature used to quantify the geometry or shape of an object. The term "geometric parameter" can include, without limitation: a linear dimension (e.g., a length, a width, a height, a thickness, a radius, a diameter, a perimeter, a circumference, a taper profile and length, a radius of curvature); a surface area (e.g., a cross-section); a volume; an area moment of inertia; and the like.

The term "relevant geometric parameter" refers to a geometric parameter of interest of a clasp retainer, whose value is to be improved or optimized in the present method. Depending on the particular application or use, the relevant geometric parameters can include dimensional properties of one or several components of the clasp retainers including, without limitation, the retentive clasp arm, the reciprocal clasp arm, the clasp body, the rest, and the like. It is also worth noting that the set of relevant geometric parameters may or may not be the same for each clasp retainer. By way of example, depending on the type and/or placement of the clasp retainers, the relevant geometric parameters can differ from one clasp retainer to another.

The term "nominal values" refers herein to realistic values provided for or assigned to the relevant geometric parameters of the clasp retainers that may serve as a useful starting point in creating the initial digital model of the RPD framework. In other words, the nominal values provided by the initial digital model for the relevant geometric parameters of each clasp retainer are intended to represent reasonable, yet likely suboptimal, values, which are to be improved, optimized or corrected through the application of the present techniques disclosed.

In some implementations, the determination of the nominal values to be used in the initial digital model of the RPD framework may be based on the values that are or could be used when fabricating the same RPD framework using conventional techniques. In other implementations, the determination of the nominal values to be used in the initial digital model of the RPD framework may instead be based on corrected values obtained during a previous application of the present method, involving the design and fabrication of a RPD framework similar to the framework under consideration. It should be noted that any suitable manner of determining nominal values for the relevant geometric parameters of the clasp retainers is encompassed by the techniques disclosed herein. It should also be noted that the nominal values provided to the set of relevant geometric parameters may or may not be the same for each clasp retainer. In particular, this means that two clasp retainers characterized by the same relevant geometric parameters may or may not have the same nominal values assigned thereto depending, for example, on their type and/or placement.

In some non-limiting exemplary implementations of the design and fabrication method disclosed herein, each clasp retainer can be characterized by the following relevant geometric parameters: (i) the length of the retentive clasp arm between its proximal and terminal ends; (ii) one or more dimensional properties of the transverse cross-section of the retentive clasp arm. By way of example, the one or more dimensional properties of the transverse cross-section can include, without limitation, at least one of a diameter, a radius, a width, a thickness, a surface area, a radius of curvature, and an area moment of inertia. It will be appreciated that any dimensional property of the transverse cross-section of a retentive clasp arm can be constant or vary along the length of the retentive clasp arm. In particular, it will be noted that, in some implementations, the relevant geometric parameters associated with the transverse cross-section of the retentive clasp arm can be defined in terms of their values at one or more selected locations along the length of the retentive clasp arm.

By way of example, and as mentioned above, in the exemplary embodiment of FIGS. 4A to 4C, the retentive clasp arm 40 of each clasp retainer 34 has a transverse cross-section 58 with a flat portion 60 and a curved portion 62, the flat portion 60 being configured for engagement with the lateral surface 46 of the abutment tooth 22. In such a case, the relevant geometric parameters of each clasp retainer 34 can be (i) the length 56 of the retentive clasp arm 40; and (ii) the width 64 and the thickness 66 of the transverse cross-section 58 of the retentive clasp arm 40 in its proximal portion 68, where the size of the transverse cross-section 58 is constant. As defined above, the width 64 of the retentive clasp arm 40 corresponds to the extent of the flat portion 60 of the transverse cross-section 58, while the thickness 66 of the retentive clasp arm 40 corresponds to the extent of the transverse cross-section 58 perpendicularly to the width 64.

Referring still to FIGS. 4A to 4C, the relevant geometric parameters of the clasp retainers 34 can be provided with the following nominal values: a length 56 having a nominal value ranging from about 0.5 cm to about 1.5 cm; a width 64 having a nominal value ranging from about 1.1 mm to about 1.3 mm; and a thickness 66 having a nominal value ranging from about 0.7 mm to about 0.8 mm. It is worth reiterating that the relevant geometric parameters and their associated nominal values could differ from one RPD framework to another, and/or from one clasp retainer to another in a particular RPD framework.

Target Values of Dislodging Force for the Clasp Retainers

Referring back to FIG. 5, and with further reference to FIGS. 4A to 4C, the method 100 further includes a step 108 of providing, for each clasp retainer 34 of the RPD framework 28, a target value of a dislodging force required for disengaging the clasp retainer 34 from the corresponding abutment tooth 22 with which the clasp retainer 34 is configured for engagement.

Throughout the present description, the terms "dislodging force" and "force of dislodgement" refer to a sufficient amount of force to be applied to a clasp retainer to cause its disengagement from the abutment tooth or structure with which the clasp retainer is intended for engagement. Dislodging forces act against retentive forces to displace an RPD from its intended position in the oral cavity of a patient. Dislodging forces can be applied by the patient with the purpose of removing the RPD from his or her mouth. Dislodging forces can also result from the masticatory forces, the effects of moving tissue, and gravity in the case of a maxillary RPD.

As mentioned above, the capability of providing satisfactory retention against reasonable forces of dislodgement is a key parameter in evaluating the clinical performance of a clasp retainer. As also mentioned above, the retention provided by a clasp retainer is related to its resistance to deformation. For a clasp retainer to be retentive, it must generally be placed in an undercut area of the abutment tooth, where it is forced to deform upon the application of a vertical dislodging force. This resistance to deformation can depend on several factors and, in particular, is generally proportional to the flexibility of the retentive clasp arm of the clasp retainer.

As used herein, the term "target value" refers to a desired and/or required value for the dislodging force required to disengage each clasp retainer of the RPD framework from its corresponding abutment tooth. As discussed in greater detail below, the application of the present method 100 aims to find corrected values for the relevant geometric parameters associated with each clasp retainer, the corrected values being such that when they are assigned to the relevant geometric parameters, the dislodging force associated to each clasp retainer matches its target value. The target values of dislodging forces can be expressed in newtons or in other suitable units. In some implementations, typical target values of dislodging forces can range from about a few newtons to about a few tens of newtons, for example between about 8 newtons to about 20 newtons.

It is to be noted that the terms "match" and "matching" should be understood to encompass not only "exactly" or "identically" matching the dislodging forces with their target values, but also "substantially", "approximately" or "subjectively" matching the target values of dislodging force, as well as providing a higher or best match among a plurality of matching possibilities. In other words, the terms "match" and "matching" are intended to refer herein to a condition in which two items are either the same or within some predetermined tolerance of each other.

Depending on the particular application of the method 100 illustrated in FIG. 5, the target value of dislodging force associated with the different clasp retainers of the RPD may or may not be the same. Indeed, while it may often be advantageous that the retention on all abutment teeth be as equal as possible, such a configuration may not be possible and/or desirable in some implementations of the method.

The determination of the target value for the dislodging force of a particular clasp retainer of an RPD framework can depend on several factors including, without limitation, (i) the type of the particular clasp retainer; (ii) the type of the RPD framework, for example whether the RPD framework is a maxillary or mandibular RPD framework; (iii) the number of the plurality of clasp retainers in the RPD framework; (iv) the arrangement of the plurality of clasp retainers in the RPD framework; (v) the type of the plurality of clasp retainers; and (vi) the position of the particular clasp retainer in the RPD framework or, similarly, the position in the oral cavity of the abutment tooth associated with the particular clasp retainer.

Depending on the particular or use of the method 100, the target values of dislodging forces for the different clasp retainers can be determined based on different techniques including, without limitation, empirical, analytical, numerical and experimental techniques, as well as on a combination of such techniques.

By way of example, in some implementations of the method 100, the provision of the target values of dislodging forces can involve retrieving or receiving previously determined target values from a database or a virtual library containing a number of combinations of target values of dislodging forces associated with different RPD framework designs and/or partially edentulous dentition types. In such a case, the target values of dislodging forces can be provided by searching the database or virtual library to find a combination or template of target values that would provide an optimal or at least acceptable match with the current RPD framework to be designed and fabricated by the application of method 100. More particularly, in such implementations, the step 108 of providing a target value of dislodging force for each clasp retainer can include steps of: providing 122 a correspondence table between a set of possible force values for the target value of the dislodging force of the clasp retainer and a set of possible RPD framework configurations; and accessing 124 the correspondence table to determine the target value of the dislodging force from the possible force values in view of an actual configuration of the RPD framework.

In some implementations, it has been found that a review of the state of knowledge of conventional fabrication techniques of RPD frameworks is often insufficient to provide clinically satisfactory and relevant target values of dislodging forces for RPD framework designed and fabricated using computer-assisted techniques such as in the present method 100. Accordingly, in some implementations, the step of providing a target value of a dislodging forces for the clasp retainers of the RPD framework have involved a preliminary step of developing a laboratory analysis protocol with the aim of determining the target values of dislodging forces of clasp retainers in various configurations of RPD frameworks.

In some implementations, this preliminary step may involve a step of quantifying dislodging forces exerted on clasp retainers for a larger number of RPD frameworks of different types and as a function of different parameters including, without limitation, the location and number of clasp retainers and associated abutment teeth, the types of clasp retainers, and the patient's dentition and other patient-specific anatomical structures. A database or virtual library such as described in the previous paragraph can be established in this manner and be accessible when performing the present method 100.

Figure 6A:
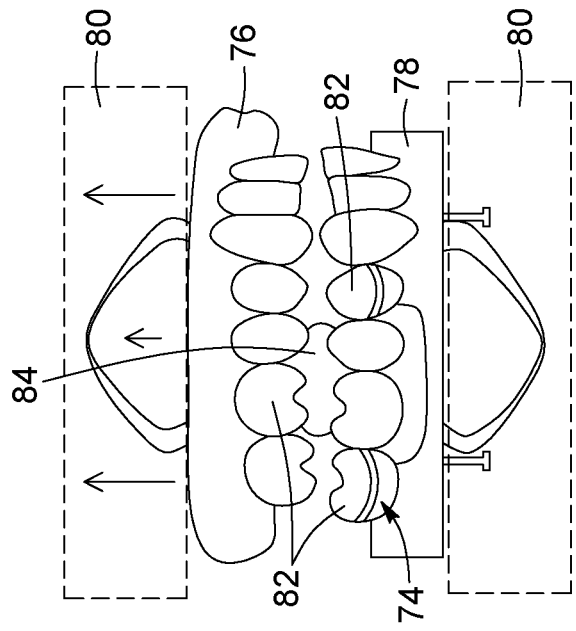
FIGS. 6A and 6B illustrate steps of a protocol for assessing retention properties and determining target values of dislodging force of an RPD subjected to simulated masticatory cycles.
Figure 6B:
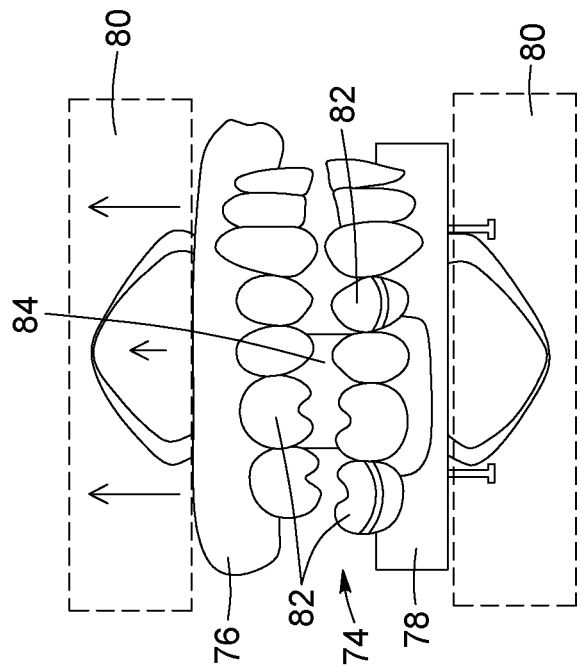

In some implementations, the provision of a correspondence table relating possible values of dislodging forces to possible RPD framework configurations can involve a preliminary step of generating the correspondence table by performing mechanical characterization tests on physical RPD framework models 74, each physical RPD framework model 74 having one of the set of possible RPD framework configurations. Turning briefly to FIGS. 6A and 6B, in some implementations, a number of different RPD framework models 74 may be mounted on articulated maxillary and mandibular casts 76, 78 connected to a mechanical testing machine 80 in order to simulate and quantify the masticatory tensile forces exerted during mastication cycles. The maxillary and mandibular casts 76, 78 are provided with artificial teeth 82 simulating remaining natural teeth. Since the dislodging forces acting on an RPD during mastication are generally proportional to the stickiness or adherence index of the masticated food 84, the maxillary and mandibular dental arches may be made to occlude on different types of sticky food 84 such as toffee, chewing gum or caramel. At the same time, the tension forces needed to separate the occluding teeth 82 may be measured by the mechanical testing machine 80. In some embodiment, different combinations of occluding teeth 82 (e.g., each tooth type alone or different tooth types in combination) may be used.

In this manner, referring back to FIG. 5, target values of dislodging forces that are deemed clinically meaningful can be stored in a database or virtual library for various types of RPDs having different arrangements of clasp retainers. The target values can be made available for later use during the step 108 of providing a target value of a dislodging force for each clasp retainer of an actual RPD framework to be designed and fabricated.

Force Analysis on the Initial Digital Model

In FIG. 5, the method 100 also includes a step 110 of performing a virtual mechanical force analysis on the initial digital model. The force analysis aims to determine corrected values for the relevant geometric parameters of each clasp retainer. These corrected values are such that when they are assigned to the relevant geometric parameters, the denture dislodging force associated to each clasp retainer matches its target value.

In general, the mechanical force analysis aims to study how variations in the values of the geometric parameters of interest of the clasp retainers affect their mechanical properties and, in particular, their dislodging force. The mechanical force analysis can involve numerically performing a series of virtual or simulated force experiments on the initial digital model of the RPD framework to determine stress and/or deformation distributions inside the RPD framework under the application of different external forces or loads.

In some implementations, the mechanical force analysis can involve simulating the application of dislodging forces to the initial digital model of RPD framework in order to test the retention properties of the clasp retainers. In particular, in some implementations, the mechanical force analysis can involve varying the values of the relevant geometric parameters of the clasp retainers over certain ranges of values in order to determine the combination of values (i.e., the "corrected values") for which the dislodging force of each clasp retainer becomes equal or substantially equal to its associated target value. Depending on the particular application or use, the mechanical force analysis can be performed on the initial digital model of the RPD framework alone or mounted to a digital model of the patient's dental arches based on the patient image data.

By performing the mechanical force analysis, the clinical performance of the RPD framework, namely its retention as quantified by dislodging forces, can be optimized, enhanced or otherwise at least partly improved. It should be noted that, in some implementations, the force analysis may find that for one or more of the relevant geometric parameters, the nominal values need not be corrected. Thus, for this or these geometric parameters, the "corrected values" are actually the same as the "nominal values".

In some implementations, the step 100 of performing a force analysis on the initial digital model can include, for each clasp retainer, a step 126 of providing one or more force equations relating the dislodging force of the clasp retainer to the set of relevant geometric parameters of the clasp retainer. The force analysis can also include performing a parametric study on the force equation(s) of each clasp retainer by varying the relevant geometric parameters. The parametric study can involve steps of setting 128 the dislodging force equal to the target value in the force equation(s), solving 130 the force equation(s) to obtain solution values for the relevant geometric parameters, the solution values corresponding to the corrected values of the relevant geometric parameters.

Figure 7A:
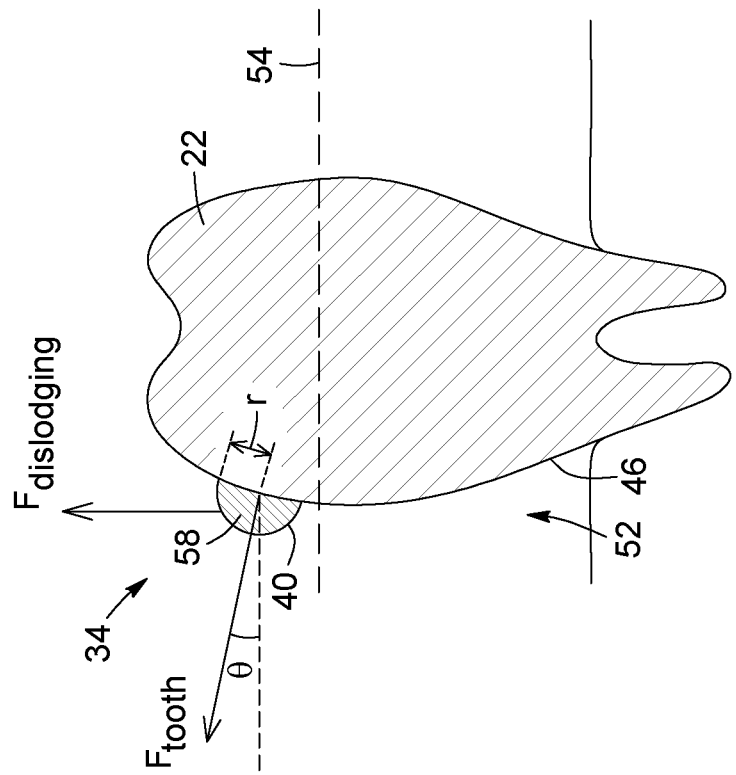
FIGS. 7A and 7B are force diagrams representing the dislodging force applied to the retentive clasp arm of a clasp retainer and the retentive force applied by the abutment tooth on the retentive clasp arm.
Figure 7B:
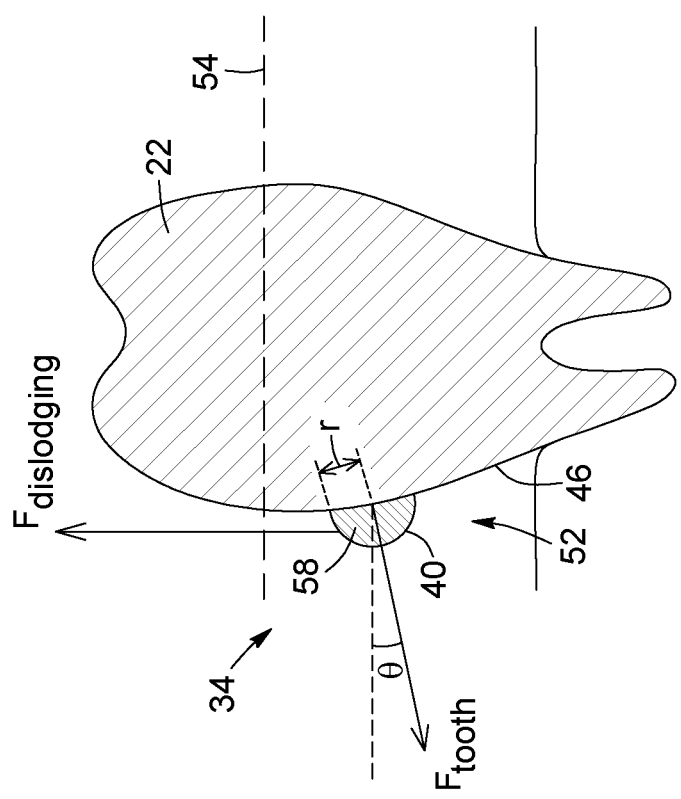

Referring to FIGS. 7A and 7B, as mentioned above, a clasp retainer 34 can be modeled as a cantilevered deflecting beam that deforms elastically in response to an applied load. In general, the force of dislodgement $F_{dislodging}$ to be applied to disengage the clasp retainer 34 from the abutment teeth 22 will depend notably on the flexibility of the retentive clasp arm 40 and the profile of the lateral surface 46 of the abutment teeth 22 (e.g., the depth, position and slope of the undercut area 52). The flexibility of the retentive clasp arm 40 is in turn generally determined by its length, its transverse cross-sectional shape and dimensions, its lengthwise taper (if any), and the material from which it is made.

In the force diagram depicted in FIGS. 7A and 7B, $F_{dislodging}$ represents the vertical dislodging force imposed on the retentive clasp arm 40 of the clasp retainer 34 (e.g., generated by a pullout force applied by the patient or from masticatory or other oral forces) and $F_{tooth}$ represents the force exerted on the retentive clasp arm 40 by the abutment tooth 22. The force $F_{tooth}$ is along the normal to the lateral surface 46 of the abutment tooth 22. The normal makes an angle $\theta$ with respect to a horizontal plane. It is noted that in FIG. 7A, the retentive clasp arm 40 is engaged with the abutment tooth 22, whereas in FIG. 7B, the retentive clasp arm 40 is disengaged from the abutment tooth 22.

Using beam theory, the force $F_{tooth}$ can be related to the amount of flexure or deflection $\delta$ experienced by the retentive clasp arm 40 as it is pulled out and removed from the undercut area 52 along the convex bulged surface profile of the abutment tooth 22 as follows:

$$\delta = [(F_{tooth} \cos \theta) L^3]/3EI, \quad (1)$$

where $F_{tooth} \cos \theta$ is the force component responsible for the deflection of the retentive clasp arm 40, L is the length of the retentive clasp arm 40, E denotes the modulus of elasticity of the material forming the retentive clasp arm 40, and I is the area moment of inertia of the transverse cross-section 58 of the retentive clasp arm 40. By way of example, in FIGS. 7A and 7B, the transverse cross-section 58 is a semicircle of radius r and I is equal to $[(\pi/8)-(8/9\pi)]r^4$, but other implementations can use other transverse cross-sectional shapes.

In order to dislodge the clasp retainer 34 from the abutment tooth 22 (i.e., to go from FIG. 7A to FIG. 7B), the following condition must be fulfilled:

$$F_{dislodging} \geq F_{tooth}\sin\theta \geq (3EI\delta/L_3)\tan\theta. \quad (2)$$

In some implementations, the step 110 of performing a force analysis can involve determining, as the corrected values, the values of the relevant geometrical parameters L and E of the clasp retainer 34 for which the dislodging force $F_{dislodging}$ becomes equal to its target value.

In some implementations, this determination can be made by imposing 132 a constraint or condition that a value of the deflection $\delta$ of the clasp retainer 34 (e.g., of its retentive clasp arm 40) remains below a predetermined deflection threshold $\delta_{threshold}$, which is expressed mathematically by inequality $\delta \leq \delta_{threshold}$. Such a deflection constraint can be imposed to ensure or help ensure that the retentive clasp arm 40 flexes without breaking or permanently (plastically) deforming.

In other implementations, a constraint related to a maximum stress (e.g., maximum bending stress) in the clasp retainer 34 (e.g., in its retentive clasp arm 40) can alternatively or additionally be used by a stress constraint that a value of the bending stress in the clasp retainer 34 remains below a predetermined bending stress threshold.

It is noted that the particular forms of Equations (1) and (2) are provided herein for illustrative purpose only. In fact, various analytical equations for the dislodging force $F_{dislodging}$ of a clasp retainer as a function of its relevant geometric parameters (e.g., L and I) and its deflection $\delta$ can be used in other implementations. By way of example, in some implementations, the equation relating the dislodging force to the relevant geometric parameters of the clasp retainer can have a more complex form (e.g., if the Euler-Bernoulli elastic curved beam theory is used) and/or involve more geometric parameters or force terms (e.g. a friction force).

Figure 8A:
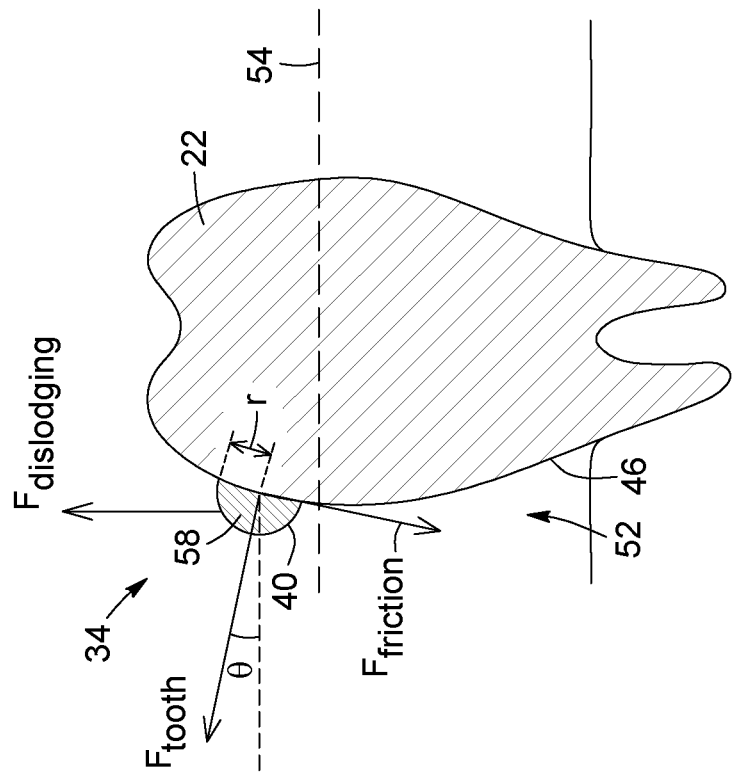
FIGS. 8A and 8B are force diagrams representing the dislodging force applied to the retentive clasp arm of a clasp retainer, the retentive force applied by the abutment tooth on the retentive clasp arm, and the friction force between the retentive clasp arm and the abutment tooth.
Figure 8B:
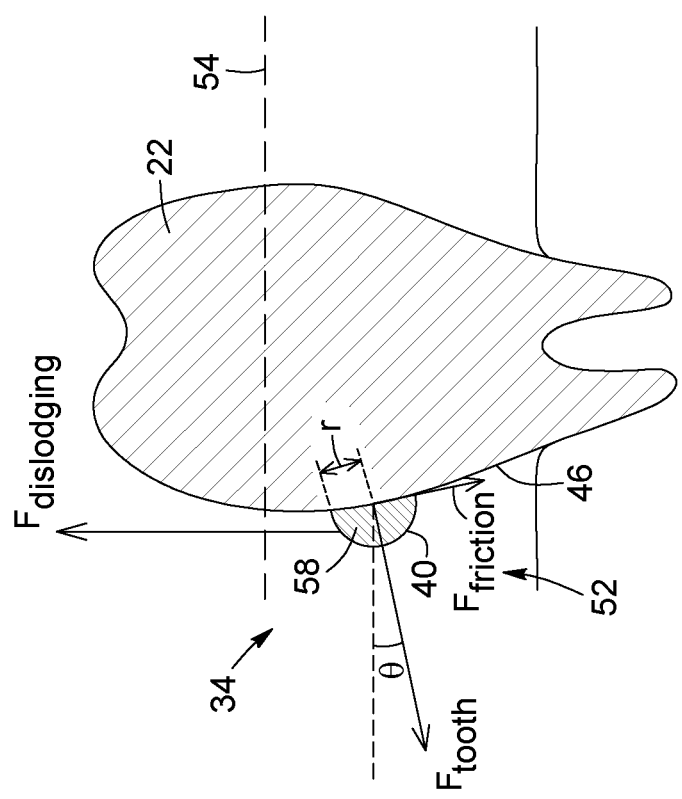

In particular, referring to FIGS. 8A and 8B, in some implementations, the effect of a friction force $F_{friction}$ between the lateral surface 46 of the abutment tooth 22 and the retentive clasp arm 40 can be added by replacing the term $F_{tooth} \sin \theta$ by $F_{tooth} \sin \theta + F_{friction} \cos \theta$ in the right-hand side of Equation (2). This yields:

$$F_{dislodging} \geq F_{tooth}\sin\theta + F_{friction}\cos\theta \geq \quad (3)$$
$$F_{tooth}\sin\theta + \mu_{friction}F_{tooth}\cos\theta \geq$$
$$F_{tooth}(\sin\theta + \mu_{friction}\cos\theta) \geq (3EI\delta/L^3)(\tan\theta + \mu_{friction}),$$

where $F_{friction} = \mu_{friction}F_{tooth}$ and $\mu_{friction}$ is the coefficient of friction between the retentive clasp arm 40 and the lateral surface 46 of the abutment tooth 22.

The mechanical force analysis can be performed using appropriate software or computer-implemented tools. By way of example, in some implementations, the mechanical force analysis can use finite element analysis (FEA) techniques. As known in the art, FEA is widely used in engineering and science to model the response of complex systems. A FEA model is obtained by providing or creating a virtual representation of the system under study as a number of discrete units, referred to as "finite elements". Once the model has been established, namely by defining the geometry and the material properties, and by applying appropriate boundary conditions, functions and equations can be established and solved, typically by a computer, to predict the response of the model to various external stimuli. FEA is used in various applications including solid mechanics, fluid mechanics, biomechanics, heat transfer, and electromagnetism. It should be noted that besides FEA-based techniques, other computational techniques enabling the mechanical behavior of RPDs to be numerically simulated may be used in other embodiments.

As mentioned above, in some implementations, the initial digital model of the RPD framework is provided as a surface representation of the RPD framework, where the RPD framework is modeled as an outer shell with an empty interior. In such implementations, the method can include a step of converting the initial digital model of the RPD framework from an initial surface representation (e.g., in STL format) to a volume representation suitable for performing a mechanical force analysis (e.g., FEA-based numerical simulations). In this regard, it is noted that various computer-implemented and software-based volume meshing techniques are known for successfully extracting a volume-based finite-element model or meshing from an initial 3D surface-based representation.

In some implementations, the virtual solidification of the surface representation of the initial digital model can involve a preliminary step of using software-implemented tools to correct artifacts in the surface representation. By way of example, the STL format approximates the surface of a 3D model by means of a plurality of juxtaposed triangles. Depending on the computational resources of the software used to generate the STL file, different errors in the positioning of the triangles may occur. The use of appropriate software-implemented tools can be used to eliminate or at least reduce the number of such defective triangles.

It is noted that the conversion of the initial digital model from a surface representation format to a volume representation format involves determining or specifying material properties for the initial digital model. Indeed, surface-based digital models define objects in terms of the geometry of its outer surface, without assigning material properties or internal details. In contrast, in volumetric digital models, the shape can be made of any number of materials. In particular, the material properties can be non-homogeneous (depend on location) and/or anisotropic (depend on direction). Non-limiting examples of possible mechanical properties that can be assigned to the volume representation of the initial digital model of the RPD framework can include ductility, hardness, toughness, point of failure, modulus of elasticity, strength, fatigue and elastic limit. Many of these properties can be determined from the analysis of force-extension diagrams.

It is noted that in some implementations of the present techniques, the method used to fabricate the RPD framework can be based on CAD/CAM selective laser sintering. The material used in selective laser sintering may be a Co—Cr alloy similar to the Co—Cr alloys used in the conventional lost-wax casting technique. However, because the use of laser sintering techniques in dental prosthesis fabrication is relatively recent, it may happen that the amount of available data on the characterization of the mechanical properties of interest of laser-melted Co—Cr alloys (e.g., elastic limit, ductility, point of failure and hardness) and on how they compare to those of traditional casted Co—Cr alloys is limited. Therefore, in some implementations, the method 100 can include a preliminary step of characterizing the mechanical properties of Co—Cr alloys processed by selective laser sintering, for example using three-point bending testing, and of comparing these mechanical properties with those of conventional casted Co—Cr alloys. In one implementation, it has been found that the properties of laser-melted and casted alloys can differ significantly from each other. It will be understood that an accurate quantification of these differences can be desirable or required in order to optimize the designs of laser-melted RPDs. It will also be understood that depending on the particular application or use, the properties of laser-melted and casted alloys may or may differ not from each other.

Correction of the Initial Digital Model

Referring back to FIG. 5, the method 100 next includes a step 112 of correcting the initial digital model by replacing, for each clasp retainer, the nominal values of the relevant geometric parameters by the corresponding corrected values, thereby obtaining a corrected digital model of the RPD framework. It will be appreciated that in order to allow the RPD framework to be fabricated by CAM techniques from the corrected digital model, the corrected digital model should preferably be obtained or exported in a format that is compatible with CAM, for example the STL format or another suitable surface or volume file format. Therefore, in some implementations, the step 112 of correcting the initial digital model can involve providing the corrected digital model of the RPD framework as a corrected surface representation of the RPD framework.

Referring to FIGS. 9A to 9C, by way of example, there is provided an example illustrating the initial digital model (solid line) of a RPD framework 28 and the corrected digital model (dashed line) of the same RPD framework 28 obtained using an implementation of the present method. In particular, FIGS. 9A to 9C depict different views of a clasp retainer 34 of the RPD framework 28, the clasp retainer 34 having a retentive clasp arm 40. With the present method, it has been found that the retention properties of the RPD framework 28 can be optimized or improved if both the length 56 and the cross-section thickness 66 of the retentive clasp arm 40 are increased by 7% compared to their respective nominal values, and if the width 64 of the retentive clasp arm 40 is decreased by 5%. Of course, these numerical values are provided by way of example only. It is also noted that depending on the application, the corrected values may or may not be the same for each clasp retainer. Moreover, it is noted that the corrections made to the nominal values for the length 56, width 64 and thickness 66 have been enlarged for illustrative purposes.

Fabricating the RPD Framework

Referring back to FIG. 5, the design and fabrication method 100 includes a step 114 of fabricating an accurate physical model of the RPD framework based on the corrected digital model. The RPD framework can be fabricated according to the corrected digital model using CAM digital techniques and processes. In some implementations, once the corrected digital model of the RPD framework is created, data representing the model can be transferred to a CAM software or module that controls a CAM system or production assembly. The CAM software can import the corrected digital model in a number of suitable digital file formats. By way of example, in some implementations, the corrected digital model can be supplied to the CAM software in the STL format which, as mentioned above, is a polyhedral representation of a 3D object that uses triangular surface facets.

Depending on the particular application and use, the CAM techniques used at the fabricating step 114 can be based on two basis approaches: (i) additive manufacturing processes, in which material is selectively deposited or fused, typically in layers; and (ii) subtractive manufacturing processes, in which material is selectively removed from a larger starting block by mechanical cutting or milling, chemical processes, or electrical discharges.

In some implementations, the present techniques may advantageously use additive manufacturing processes, due to their capability of fabricating complex forms with suitable precision. By way of example, in some embodiments, the additive manufacturing process can be selective laser sintering (SLS). SLS uses a laser to build up a 3D object by selectively fusing together successive layers of fine metallic powders. As other additive manufacturing processes, SLS involves numerically slicing the CAD file of the object into thin 2D layers, which are then fabricated layer by layer until the 3D object is formed. In some implementations, the material used to fabricate the RPD framework by laser sintering can be a Co—Cr alloy.

However, depending on the particular application or use, different additive or subtractive manufacturing processes and/or different materials can be used to fabricate the RPD framework according to the corrected digital mode. Non-limiting examples of additive manufacturing processes include selective laser melting, direct laser metal sintering, 3D printing, stereolithography, digital light projection, fused deposition modeling, electron-beam projection lithography and electron beam melting. A non-limiting example of a subtractive manufacturing process is computer numerical control (CNC) milling.

In some implementations, once the RPD framework has been fabricated according to the corrected digital model, it may be subjected to various post-fabrication processes prior to being delivered to the patient. Exemplary post-fabrication processes include, without limitation, grinding, polishing, annealing, cleaning, sterilizing, packing and labeling. In some cases, the RPD framework designed and fabricated by the method 100 depicted in FIG. 5 is intended not to be worn by a patient, but to be subjected to different tests to assess and analyze the performance and quality of the method 100. By way of example, the RPD framework may be tested mechanically for retention and fatigue resistance, or be tested to identify errors between the digital design and the final manufactured item.

Method for Improving an Initial Digital Model of an RPD Framework

Figure 10:
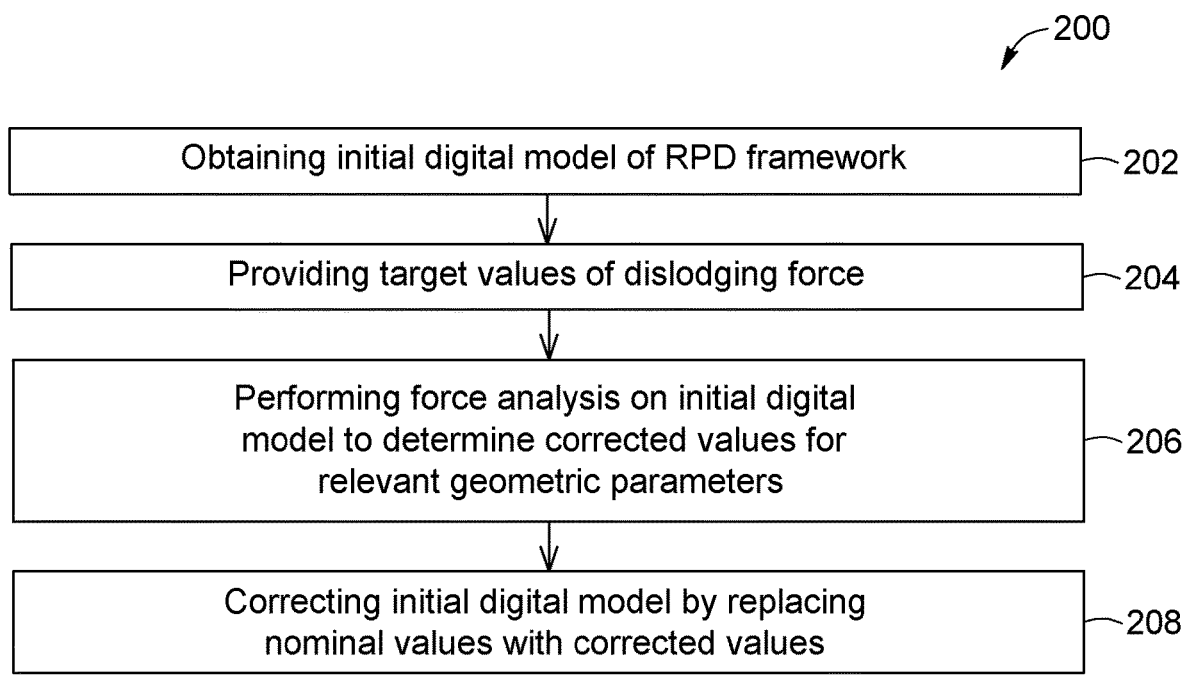
FIG. 10 is a flow chart of a method for improving an initial digital model of an RPD framework.

According to another aspect, and with particular reference to FIGS. 1 to 3 and 10, there is provided a computer-implemented method 200 for improving an initial digital model of an RPD framework obtained based on patient image data of at least part of an oral cavity of the patient. More particularly, FIG. 10 depicts a flow chart of an embodiment of the method 200, which, by way of example, can be performed to improve an initial digital model of an RPD framework such as the ones illustrated in FIGS. 1 to 3, or another RPD framework.

It will be appreciated that the improvement method 200 illustrated in FIG. 10 can share several steps with the design and fabrication method 100 disclosed above with reference to FIG. 5. Such shared steps include, without limitation, the steps of: obtaining 104 an initial digital model of the RPD framework; identifying 106 set of relevant geometric parameters and associated nominal values; providing 108 a target value of a dislodging force for each clasp retainer of the RPD framework; performing 110 a mechanical force analysis on the initial digital model to determine corrected values for the relevant geometric parameters of each clasp retainer; and correcting 112 the initial digital model by replacing, for each clasp retainer, the nominal values of the relevant geometric parameters by the corresponding corrected values. Accordingly, the description of these steps and of any features or variants thereof that were described above in relation to the design and fabrication method 100 depicted in FIG. 5 shall not be repeated in detail hereinbelow.

Referring to FIG. 10, the improvement method 200 first includes a step 202 of providing the initial digital model of the RPD framework. As illustrated in FIGS. 1 to 3, the RPD framework 28 includes a plurality of clasp retainers 34. Each clasp retainer 34 is configured for removable engagement with a corresponding one of a number of abutment teeth 22 of a patient, and is also characterized by a set of relevant geometric parameters. Each relevant geometric parameter is provided with a nominal value in the initial digital model.

The method also includes a step 204 of providing, for each clasp retainer, a target value of a respective dislodging force required for disengaging the clasp retainer from the corresponding abutment tooth with which the clasp retainer is configured for engagement.

The method 200 further includes a step 206 of performing a mechanical force analysis on the initial digital model to determine corrected values for the relevant geometric parameters of each clasp retainer, such that when the corrected values are assigned to the relevant geometric parameters, the dislodging force associated to each clasp retainer matches the target value thereof.

The method 200 also includes a step 208 of correcting the initial digital model by replacing, for each clasp retainer, the nominal values of the relevant geometric parameters by the corresponding corrected values, thereby obtaining a corrected digital model of the RPD framework.

Computer Readable Memory

According to another aspect of the invention, there is provided a computer readable memory storing computer executable instructions thereon that, when executed by a computer, can perform various steps of the methods disclosed herein. Again, it will be appreciated that these method steps can share several steps with the design and fabrication method 100 described above with reference to FIG. 5, and with the improvement method 200 disclosed described above with reference to FIG. 10. Accordingly, the description of these steps and of any features or variants thereof described above in relation to these two methods shall not be repeated in detail hereinbelow.

A first step can include obtaining an initial digital model of RPD framework based on image data of an oral cavity of a patient. Non-limiting examples of a RPD framework 28 whose initial digital model can be provided at this step is illustrated in FIGS. 1 to 3. The RPD framework 28 can include a plurality of clasp retainers 34, each of which configured for removable engagement with a corresponding one of a number of abutment teeth of the patient and characterized by a set of relevant geometric parameters. As mentioned above, the initial digital model can provide nominal values for the relevant geometric parameters of each clasp retainer 34.

Another step includes providing, for each clasp retainer, a target value of a dislodging force. This dislodging force represents the amount of force that needs to be imparted by the patient for dislodging or disengaging the clasp from its corresponding abutment tooth.

A further step can include performing a mechanical force analysis on the initial digital model. The simulated force analysis aims to determine corrected values for the relevant geometric parameters of each clasp retainer. These corrected values are such that when they are assigned to the relevant geometric parameters, the dislodging force associated to each clasp retainer matches its target value.

Another step can include correcting the initial digital model by replacing, for each clasp retainer, the nominal values of the relevant geometric parameters by the corresponding corrected values, thereby obtaining a corrected digital model of the RPD framework.

A further step can include outputting the corrected digital model of the RPD framework to a computer-aided manufacturing (CAM) system for fabricating the RPD framework based on the corrected digital model.

As used herein, the term "computer readable memory" is intended to refer to a non-transitory and tangible computer product that can store and communicate executable instructions for the implementation of various steps of the methods disclosed herein. The computer readable memory can be any computer data storage device or assembly of such devices including, for example: a temporary storage unit such as a random-access memory (RAM) or dynamic RAM; a permanent storage such as a hard disk; an optical storage device, such as a CD or DVD (rewritable or write once/read only); a flash memory; and/or other non-transitory memory technologies. A plurality of such storage devices may be provided, as can be understood by those skilled in the art. The computer readable memory may be associated with, coupled to or included in a computer configured to execute instructions stored in the computer readable memory in connection with various functions associated with the computer.

As used herein, the term "computer" refers broadly to any computing or processing unit or device including electronic circuitry that can control and execute, at least partly, instructions required to perform various steps of the method disclosed herein. The computer can be embodied by a general purpose computer, a central processing unit (CPU), a microprocessor, a microcontroller, a processing core, or any other processing resource or any combination of such computer or processing resources configured to operate collectively as a processing unit.

Several alternative embodiments and examples have been described and illustrated herein. The embodiments described above are intended to be exemplary. One skilled in the art would appreciate the features of the individual embodiments, and the possible combinations and variations of the components. One skilled in the art would further appreciate that any of the embodiments could be provided in any combination with the other embodiments disclosed herein. It is understood that the techniques disclosed herein may be embodied in other specific forms without departing from the central characteristics thereof. The present examples and embodiments, therefore, are to be considered in all respects as illustrative and not restrictive, and the present techniques are not to be limited to the details given herein. Accordingly, while the specific embodiments have been illustrated and described, numerous modifications come to mind without significantly departing from the scope of the invention as defined in the appended claims.

The invention claimed is:

1. A method for designing and fabricating a removable partial denture (RPD) framework comprising a number of clasp retainers, each clasp retainer being configured for removable engagement with a corresponding one of a number of abutment teeth of a patient, the method comprising:
    providing patient image data of at least part of an oral cavity of the patient;
    obtaining an initial digital model of the RPD framework based on the patient image data;
    for each clasp retainer, identifying a set of relevant geometric parameters and providing each relevant geometric parameter with a nominal value in the initial digital model;
    providing, for each clasp retainer, a target value of a dislodging force for disengaging the clasp retainer from the corresponding abutment tooth with which the clasp retainer is configured for engagement;
    performing a force analysis on the initial digital model, the force analysis comprising, for each clasp retainer:
        providing one or more force equations relating the dislodging force of the clasp retainer to the set of relevant geometric parameters of the clasp retainer; and
        solving the one or more force equations, said solving comprising determining corrected values for the relevant geometric parameters of the clasp retainer, such that when the corrected values are assigned to the relevant geometric parameters in the one or more force equations, the dislodging force associated to the clasp retainer matches the target value thereof;
    correcting the initial digital model by replacing, for each clasp retainer, the nominal values of the relevant geometric parameters by the corresponding corrected values, thereby obtaining a corrected digital model of the RPD framework; and
    fabricating the RPD framework based on the corrected digital model.

2. The method according to claim 1, wherein providing the patient image data comprises acquiring the patient image data using an image capture device.

3. The method according to claim 1, wherein obtaining the initial digital model of the RPD framework comprises:
    providing a virtual library containing a plurality of RPD framework templates; and
    accessing the virtual library and selecting therefrom a selected one of the plurality of RPD framework templates as the initial digital model of the RPD framework.

4. The method according to claim 1, wherein obtaining the initial digital model of the RPD framework comprises providing the initial digital model as an initial surface representation of the RPD framework.

5. The method according to claim 4, wherein performing the force analysis on the initial digital model of the RPD framework comprises a preliminary step of converting the initial digital model from the initial surface representation to a volume representation of the RPD framework.

6. The method according to claim 1, wherein each clasp arm comprises a clasp body and a retentive clasp arm having a proximal end, a terminal end, a length extending between the proximal end and the terminal end, and a transverse cross-section perpendicular to the length, the retentive clasp arm being cantilevered from the clasp body at the proximal end thereof and configured to engage and extend around at least a portion of a lateral surface of the corresponding abutment tooth, the retentive clasp arm being resiliently deflectable relative to the lateral surface of the corresponding abutment tooth during insertion and removal of the RPD framework; and wherein the set of relevant geometric parameters of each clasp arm includes the length of the retentive clasp arm and one or more dimensional properties of the transverse cross-section of the retentive clasp arm.

7. The method according to claim 1, wherein, for each clasp retainer, providing the target value of the dislodging force comprises:
    providing a correspondence table between a set of possible force values for the target value of the dislodging force of the clasp retainer and a set of possible RPD framework configurations; and
    accessing the correspondence table to determine the target value of the dislodging force from the possible force values in view of an actual configuration of the RPD framework.

8. The method according to claim 1, wherein, for each clasp retainer, providing the target value of the dislodging force comprises providing the target value of the dislodging force according to a predetermined value of masticatory force.

9. The method according to claim 1, wherein performing the force analysis on the initial digital model comprises performing a finite element analysis.

10. The method according to claim 1, wherein fabricating the RPD framework based on the corrected digital model comprises using a computer-aided manufacturing (CAM) process.

11. A method for improving an initial digital model of a removable partial denture (RPD) framework obtained based on patient image data of at least part of an oral cavity of the patient, the method comprising:
   providing the initial digital model of the RPD framework, the RPD framework comprising a plurality of clasp retainers, each clasp retainer being configured for removable engagement with a corresponding one of a number of abutment teeth of a patient and characterized by a set of relevant geometric parameters, each relevant geometric parameter being provided with a nominal value in the initial digital model;
   providing, for each clasp retainer, a target value of a dislodging force for disengaging the clasp retainer from the corresponding abutment tooth with which the clasp retainer is configured for engagement;
   performing a force analysis on the initial digital model, the force analysis comprising, for each clasp retainer:
      simulating the application of the dislodging force on the initial digital model of the clasp retainer while varying the relevant geometric parameters of the clasp retainer around the nominal values thereof; and
      determining, from said simulating and varying, corrected values for the relevant geometric parameters of the clasp retainer, such that when the corrected values are assigned to the relevant geometric parameters, the dislodging force associated to the clasp retainer matches the target value thereof; and
   correcting the initial digital model by replacing, for each clasp retainer, the nominal values of the relevant geometric parameters by the corresponding corrected values, thereby obtaining a corrected digital model of the RPD framework.

12. The method according to claim 11, wherein providing the initial digital model comprises providing the initial digital model as an initial surface representation of the RPD framework.

13. The method according to claim 12, wherein performing the force analysis on the initial digital model of the RPD framework comprises a preliminary step of converting the initial digital model from the initial surface representation to a volume representation of the RPD framework.

14. The method according to claim 11, wherein each clasp arm comprises a clasp body and a retentive clasp arm having a proximal end, a terminal end, a length extending between the proximal end and the terminal end, and a transverse cross-section perpendicular to the length, the retentive clasp arm being cantilevered from the clasp body at the proximal end thereof and configured to engage and extend around at least a portion of a lateral surface of the corresponding abutment tooth, the retentive clasp arm being resiliently deflectable relative to the lateral surface of the corresponding abutment tooth during insertion and removal of the RPD framework; and wherein the set of relevant geometric parameters of each clasp arm includes the length of the retentive clasp arm and one or more dimensional properties of the transverse cross-section of the retentive clasp arm.

15. The method according to claim 11, wherein, for each clasp retainer, providing the target value of the dislodging force comprises:
   providing a correspondence table between a set of possible force values for the target value of the dislodging force of the clasp retainer and a set of possible RPD framework configurations; and
   accessing the correspondence table to determine the target value of the dislodging force from the possible force values in view of an actual configuration of the RPD framework.

16. The method according to claim 11, wherein performing the force analysis on the initial digital model comprises performing a finite element analysis.

17. The method according to claim 11, wherein performing the force analysis on the initial digital model comprises, for each clasp retainer:
   providing one or more force equations relating the dislodging force of the clasp retainer to the set of relevant geometric parameters of the clasp retainer;
   setting the dislodging force equal to the target value in the one or more force equations; and
   solving the one or more force equations to obtain solution values for the relevant geometric parameters, the solution values corresponding to the corrected values of the relevant geometric parameters.

18. A non-transitory computer readable memory storing computer executable instructions thereon that, when executed by a computer, perform steps of:
   receiving patient image data of at least part of an oral cavity of a patient;
   obtaining an initial digital model of a removable partial denture (RPD) framework based on patient image data, the RPD framework comprising a plurality of clasp retainers, each clasp retainer being configured for removable engagement with a corresponding one of a number of abutment teeth of the patient;
   for each clasp retainer, identifying a set of relevant geometric parameters and providing each relevant geometric parameter with a nominal value in the initial digital model;
   providing, for each clasp retainer, a target value of a dislodging force for disengaging the clasp retainer from the corresponding abutment tooth with which the clasp retainer is configured for engagement;
   performing a force analysis on the initial digital model, the force analysis comprising, for each clasp retainer:
      providing one or more force equations relating the dislodging force of the clasp retainer to the set of relevant geometric parameters of the clasp retainer;
      performing a parametric study on the one or more force equations, the parametric study comprising varying the relevant geometric parameters of the clasp retainer while simulating the application of the dislodging force on the initial digital model of the clasp retainer; and
      determining, from the parametric study, corrected values for the relevant geometric parameters of the clasp retainer, such that when the corrected values are assigned to the relevant geometric parameters in the one or more force equations, the dislodging force associated to the clasp retainer matches the target value thereof; and
   correcting the initial digital model by replacing, for each clasp retainer, the nominal values of the relevant geometric parameters by the corresponding corrected values, thereby obtaining a corrected digital model of the RPD framework.

19. The non-transitory computer readable memory according to claim 18, in which the steps further comprise outputting the corrected digital model of the RPD framework to a computer-aided manufacturing (CAM) system for fabricating the RPD framework based on the corrected digital model.

20. A removable partial denture (RPD) framework designed and fabricated by the method according to claim 1.

21. The method according to claim 1, wherein the one or more force equations account for a deflection of the clasp retainer, a bending stress in the clasp retainer, a friction force between the clasp retainer and the abutment tooth, or a combination thereof.

* * * * *